US012804743B2

(12) United States Patent

Pan

(10) Patent No.: US 12,804,743 B2

(45) Date of Patent: Nov. 17, 2026

(54) METHOD AND APPARATUS FOR REALIZING LOCAL ID ALLOCATION FOR UE-TO-UE RELAY COMMUNICATION IN A WIRELESS COMMUNICATION SYSTEM

(71) Applicant: ASUS Technology Licensing Inc., Taipei City (TW)

(72) Inventor: Li-Te Pan, Taipei City (TW)

(73) Assignee: ASUS Technology Licensing Inc., Taipei City (TW)

( * ) Notice: Subject to any disclaimer, the term of this patent is extended or adjusted under 35 U.S.C. 154(b) by 359 days.

(21) Appl. No.: 18/202,562

(22) Filed: May 26, 2023

(65) Prior Publication Data

US 2023/0389094 A1 Nov. 30, 2023

Related U.S. Application Data

(60) Provisional application No. 63/346,462, filed on May 27, 2022, provisional application No. 63/346,473, filed on May 27, 2022.

(51) Int. Cl.

*H04W 76/14* (2018.01)

*H04L 51/58* (2022.01)

(Continued)

(52) U.S. Cl.

CPC ............. *H04W 76/14* (2018.02); *H04L 51/58* (2022.05); *H04L 69/24* (2013.01); *H04L 69/324* (2013.01)

(58) Field of Classification Search

None

See application file for complete search history.

(56) References Cited

U.S. PATENT DOCUMENTS

2022/0174783 A1* 6/2022 Chen ........................ H04W 4/06
2022/0338092 A1* 10/2022 Wang ..................... H04W 40/22
2022/0418015 A1* 12/2022 Paladugu .............. H04L 5/0048

FOREIGN PATENT DOCUMENTS

WO WO-2018044144 A1 * 3/2018 ............ H04W 76/14
WO 2021139906 A1 7/2021

(Continued)

OTHER PUBLICATIONS

3GPP TS33.536 §5.3.3.1.2.3 V17.0.0 (Mar. 2022) (Year: 2022).*

(Continued)

*Primary Examiner* — Jae Y Lee

(74) *Attorney, Agent, or Firm* — Cooper Legal Group LLC

(57) ABSTRACT

A method and device are disclosed for supporting a third User Equipment (UE). In one embodiment, the third UE receives a first PC5-S message from a first UE for initiating a procedure of establishing a first layer-2 link between the first UE and the third UE. The third UE also transmits a second PC5-S message to the first UE for establishing a first security context between the first UE and the third UE in the procedure of establishing the first layer-2 link. The third UE further receives a third PC5-S message from the first UE for completing establishment of the first security context in the procedure of establishing the first layer-2 link. In addition, the third UE transmits a fourth PC5-S message to the first UE for completing the procedure of establishing the first layer-2 link, wherein the fourth PC5-S message includes a layer-2 identity of a second UE.

16 Claims, 23 Drawing Sheets

(51) Int. Cl.
*H04L 69/24* (2022.01)
*H04L 69/324* (2022.01)

(56) References Cited

FOREIGN PATENT DOCUMENTS

| | | | | | |
|---|---|---|---|---|---|
| WO | WO-2022038292 | A1 * | 2/2022 | ............ | H04W 48/18 |
| WO | WO-2023072417 | A1 * | 5/2023 | ............ | H04L 45/24 |

OTHER PUBLICATIONS

3GPP TS 23.287 §5.2.1.4 V17.2.0 (Dec. 2021) (Year: 2021).*
3GPP TS 23.587 §6.1.2.2.3 p. 22, §6.1.2.12 p. 49 V17.5.0 (Mar. 2022) (Year: 2022).*
3rd Generation Partnership Project: Technical Specification Group Services and System Aspects: "Study on System Enhancement for Proximity Based Services (ProSe) in the 5G System (5GS)" 3GPP, TR 23.700-33 VO.3.0 (May 2022) 148 pages.
3rd Generation Partnership Project: Technical Specification Group Services and System Aspects: "Study on System Enhancement for Proximity Based Services (ProSe) in the 5G System (5GS)" 3GPP, TR 23.752 V17.0.0 (Mar. 2021), 178 pages
InterDigital: Solution for Privacy Handling with Layer-3 Based UE-to-UE Relay, 3 GPP TSG-SA3 Meeting #102-3, S3-210824, e-meeting, Jan. 18-29, 2021, 4 pages.
3rd Generation Partnership Project: Technical Specification Group Services and System Aspects: Study on Security Aspects of Enhancement for Proximity Based Services in the 5G System (5GS), 3GPP TR 33.847 VO.7.0 (Aug. 2021), 148 pages.
Corresponding Korean Intellectual Property Office Application No. 10-2023-0068234, Office Action dated Jan. 23, 2026, 7 pages.

* cited by examiner

| IEI | Information Element | Type/Reference | Presence | Format | Length |
|---|---|---|---|---|---|
| | PROSE DIRECT LINK ESTABLISHMENT REQUEST message identity | ProSe PC5 signalling message type 11.3.1 | M | V | 1 |
| | Sequence number | Sequence number 11.3.2 | M | V | 1 |
| | Source user info | Application layer ID 11.3.4 | M | LV | 2-256 |
| | UE security capabilities | UE security capabilities 11.3.11 | M | LV | 3-9 |
| | UE PC5 unicast signalling security policy | UE PC5 unicast signalling security policy 11.3.12 | M | V | 1 |
| 7B | ProSe identifiers | ProSe identifier 11.3.3 | O | TLV-E | 21-65538 |
| 74 | Key establishment information container | Key establishment information container 11.3.9 | O | TLV-E | 4-65538 |
| 56 | Nonce_1 | Nonce 11.3.10 | O | TV | 17 |
| 5C | MSB of $K_{NRP-sess}$ ID | MSB of $K_{NRP-sess}$ ID 11.3.13 | O | TV | 2 |
| 28 | Target user info | Application layer ID 11.3.4 | O | TLV | 3-257 |
| 58 | $K_{NRP}$ ID | $K_{NRP}$ ID 11.3.14 | O | TV | 5 |
| 54 | Relay service code | Relay service code 11.3.26 | O | TV | 4 |
| 7D | UE identity | 5GS mobile identity 11.3.30 | O | TLV-E | 4-n |

FIG. 11 (PRIOR ART)

| IEI | Information Element | Type/Reference | Presence | Format | Length |
|---|---|---|---|---|---|
| | PROSE DIRECT LINK ESTABLISHMENT ACCEPT message identity | ProSe PC5 signalling message type 11.3.1 | M | V | 1 |
| | Sequence number | Sequence number 11.3.2 | M | V | 1 |
| | Source user info | Application layer ID 11.3.4 | M | LV | 2-256 |
| | Configuration of UE PC5 unicast user plane security protection | Configuration of UE PC5 unicast user plane security protection 11.3.23 | M | V | 1 |
| 79 | QoS flow descriptions | PC5 QoS flow descriptions 11.3.5 | O | TLV-E | 6-65538 |
| 7C | QoS rules | PC5 QoS rules 11.3.x | O | TLV-E | 7-65538 |
| 62 | IP address configuration | IP address configuration 11.3.6 | O | TV | 2 |
| 61 | Target link local IPv6 address | Link local IPv6 address 11.3.7 | O | TV | 17 |

FIG. 12 (PRIOR ART)

| IEI | Information Element | Type/Reference | Presence | Format | Length |
|---|---|---|---|---|---|
| | PROSE DIRECT LINK SECURITY MODE COMMAND message identity | ProSe PC5 signalling message type 11.3.1. | M | V | 1 |
| | Sequence number | Sequence number 11.3.2 | M | V | 1 |
| | Selected security algorithms | Selected security algorithms 11.3.22 | M | V | 1 |
| | UE security capabilities | UE security capabilities 11.3.11 | M | LV | 3-9 |
| 59 | UE PC5 unicast signalling security policy | UE PC5 unicast signalling security policy 11.3.12 | O | TV | 2 |
| 57 | Nonce_2 | Nonce 11.3.10 | O | TV | 17 |
| 5D | LSB of $K_{NRP\text{-}sess}$ ID | LSB of $K_{NRP\text{-}sess}$ ID 11.3.15 | O | TV | 2 |
| 74 | Key establishment information container | Key establishment information container 11.3.9 | O | TLV-E | 4-65538 |
| 5A | MSBs of $K_{NRP}$ ID | MSBs of $K_{NRP}$ ID 11.3.16 | O | TV | 3 |

FIG. 13 (PRIOR ART)

| IEI | Information Element | Type/Reference | Presence | Format | Length |
|---|---|---|---|---|---|
| | PROSE DIRECT LINK SECURITY MODE COMPLETE message identity | ProSe PC5 signalling message type 11.3.1. | M | V | 1 |
| | Sequence number | Sequence number 11.3.2 | M | V | 1 |
| | UE PC5 unicast user plane security policy | UE PC5 unicast user plane security policy 11.3.23 | M | V | 1 |
| 79 | QoS flow descriptions | PC5 QoS flow descriptions 11.3.5 | O | TLV-E | 6-65538 |
| 62 | IP address configuration | IP address configuration 11.3.6 | O | TV | 2 |
| 61 | Target link local IPv6 address | Link local IPv6 address 11.3.7 | O | TV | 17 |
| 5B | LSBs of $K_{NRP}$ ID | LSBs of $K_{NRP}$ ID 11.3.17 | O | TV | 3 |
| 7C | QoS rules | PC5 QoS rules 11.3.29 | O | TLV-E | 7-65538 |

FIG. 14 (PRIOR ART)

METHOD AND APPARATUS FOR REALIZING LOCAL ID ALLOCATION FOR UE-TO-UE RELAY COMMUNICATION IN A WIRELESS COMMUNICATION SYSTEM

CROSS-REFERENCE TO RELATED APPLICATIONS

The present application claims the benefit of U.S. Provisional Patent Application Ser. Nos. 63/346,462 and 63/346,473 filed on May 27, 2022, the entire disclosures of which are incorporated herein in its entirety by reference.

FIELD

This disclosure generally relates to wireless communication networks, and more particularly, to a method and apparatus for realizing local ID allocation for UE-to-UE relay communication in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

A method and device are disclosed for supporting a third User Equipment (UE). In one embodiment, the third UE receives a first PC5-S message from a first UE for initiating a procedure of establishing a first layer-2 link between the first UE and the third UE. The third UE also transmits a second PC5-S message to the first UE for establishing a first security context between the first UE and the third UE in the procedure of establishing the first layer-2 link. The third UE further receives a third PC5-S message from the first UE for completing establishment of the first security context in the procedure of establishing the first layer-2 link. In addition, the third UE transmits a fourth PC5-S message to the first UE for completing the procedure of establishing the first layer-2 link, wherein the fourth PC5-S message includes a layer-2 identity of a second UE.

BRIEF DESCRIPTION OF THE DRAWINGS

FIG. 11 is a reproduction of Table 10.3.1.1.1 of 3GPP TS 24.554 V17.0.0.

FIG. 12 is a reproduction of Table 10.3.2.1.1 of 3GPP TS 24.554 V17.0.0.

FIG. 13 is a reproduction of Table 10.3.13.1.1 of 3GPP TS 24.554 V17.0.0.

FIG. 14 is a reproduction of Table 10.3.14.1.1 of 3GPP TS 24.554 V17.0.0.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, 3GPP NR (New Radio), or some other modulation techniques.

In particular, the exemplary wireless communication systems and devices described below may be designed to support one or more standards such as the standard offered by a consortium named “3rd Generation Partnership Project” referred to herein as 3GPP, including: TS 23.287 V17.1.0, “Architecture enhancements for 5G System (5GS) to support Vehicle-to-Everything (V2X) services (Release 17)”; TS 23.304 V17.2.1, “Proximity based Services (ProSe)

in the 5G System (5GS) (Release 17)"; TS 24.554 V17.0.0, "Proximity-services (ProSe) in 5G System (5GS) protocol aspects; Stage 3 (Release 17)"; TS 38.331 V17.0.0, "Radio Resource Control (RRC) protocol specification (Release 17)"; TS 38.323 V17.0.0, "Packet Data Convergence Protocol (PDCP) specification (Release 17)"; TR 38.836 V17.0.0, "Study on NR sidelink relay; (Release 17)"; and TR 23.700-33 V0.2.0, "Study on system enhancement for Proximity based services (ProSe) in the 5G System (5GS); Phase 2; (Release 18)". The standards and documents listed above are hereby expressly incorporated by reference in their entirety.

Figure 1:
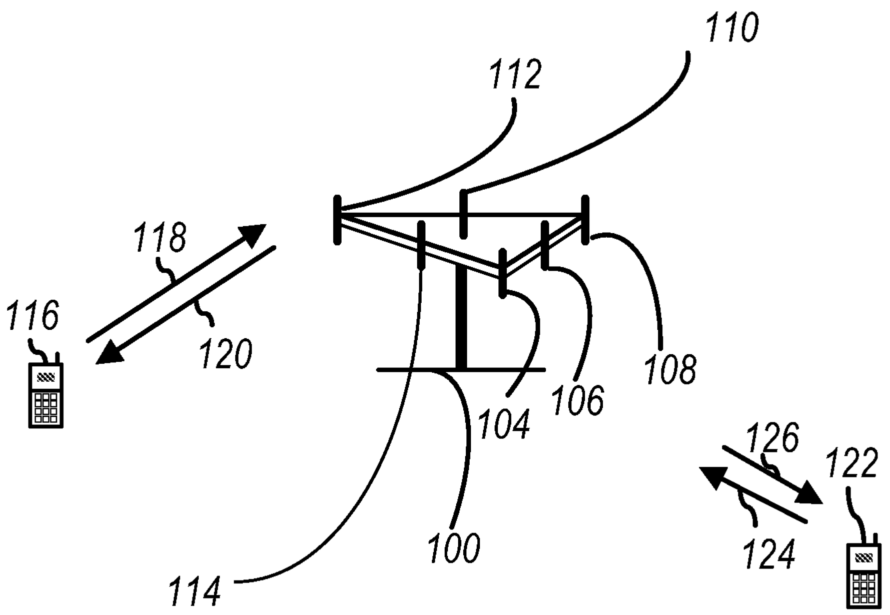
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an evolved Node B (eNB), a network node, a network, or some other terminology. An access terminal (AT) may also be called user equipment (UE), a wireless communication device, terminal, access terminal or some other terminology.

Figure 2:
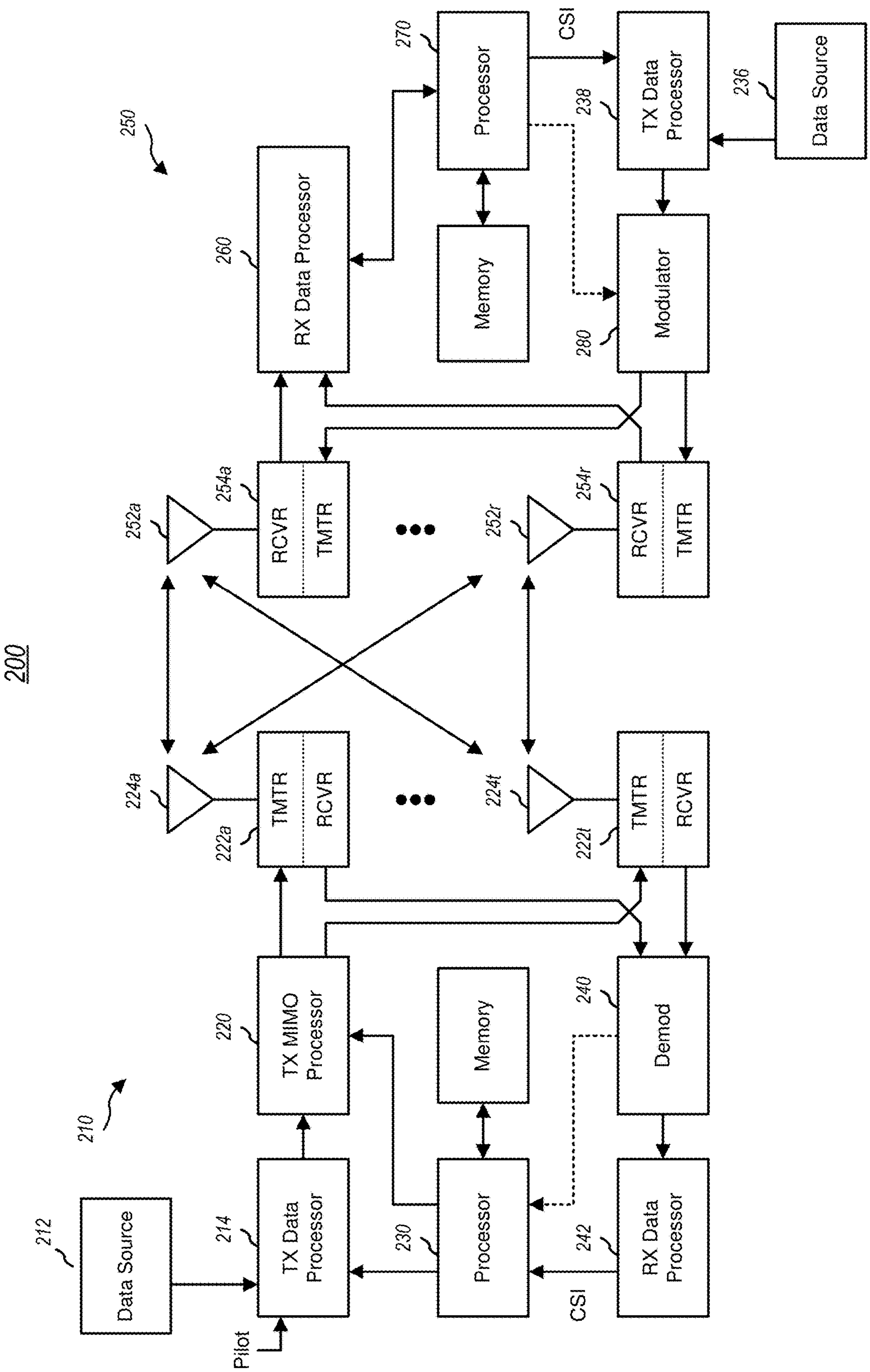
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222*a* through 222*t*. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222*a* through 222*t* are then transmitted from $N_T$ antennas 224*a* through 224*t*, respectively.

At receiver system 250, the transmitted modulated signals are received by $N_R$ antennas 252*a* through 252*r* and the received signal from each antenna 252 is provided to a respective receiver (RCVR) 254*a* through 254*r*. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254*a* through 254*r*, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
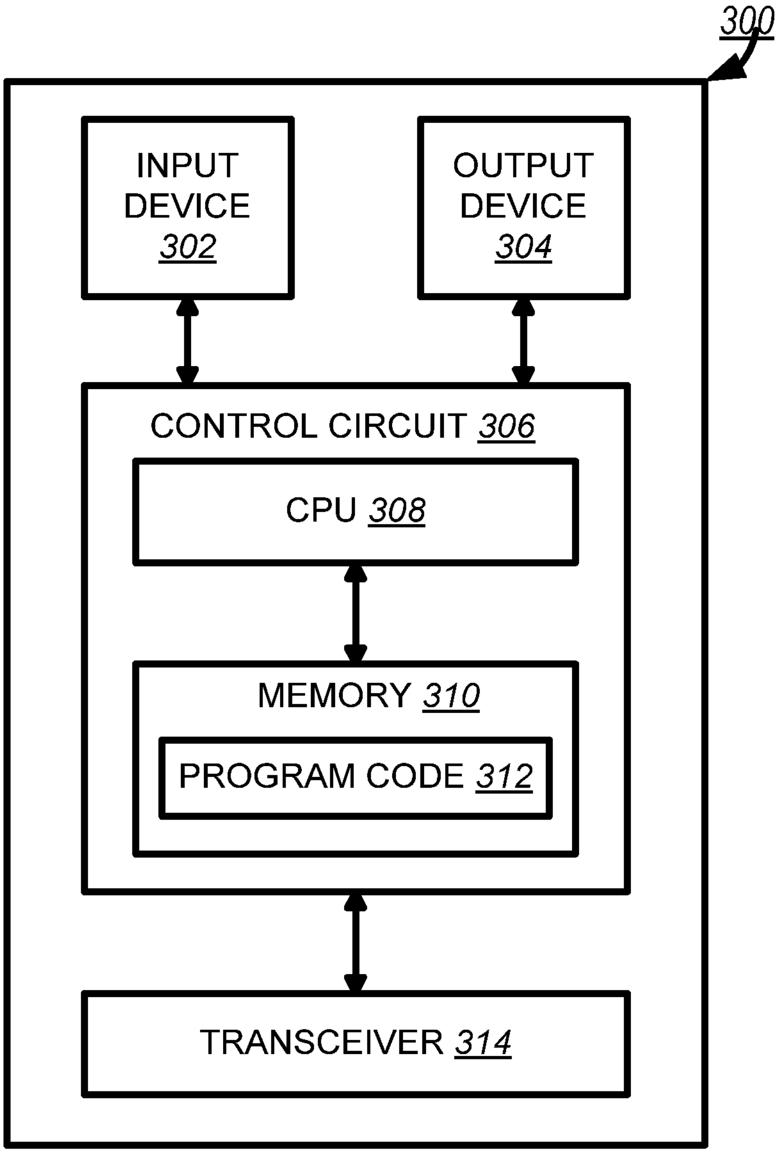
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1 or the base station (or AN) 100 in FIG. 1, and the wireless communications system is preferably the NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
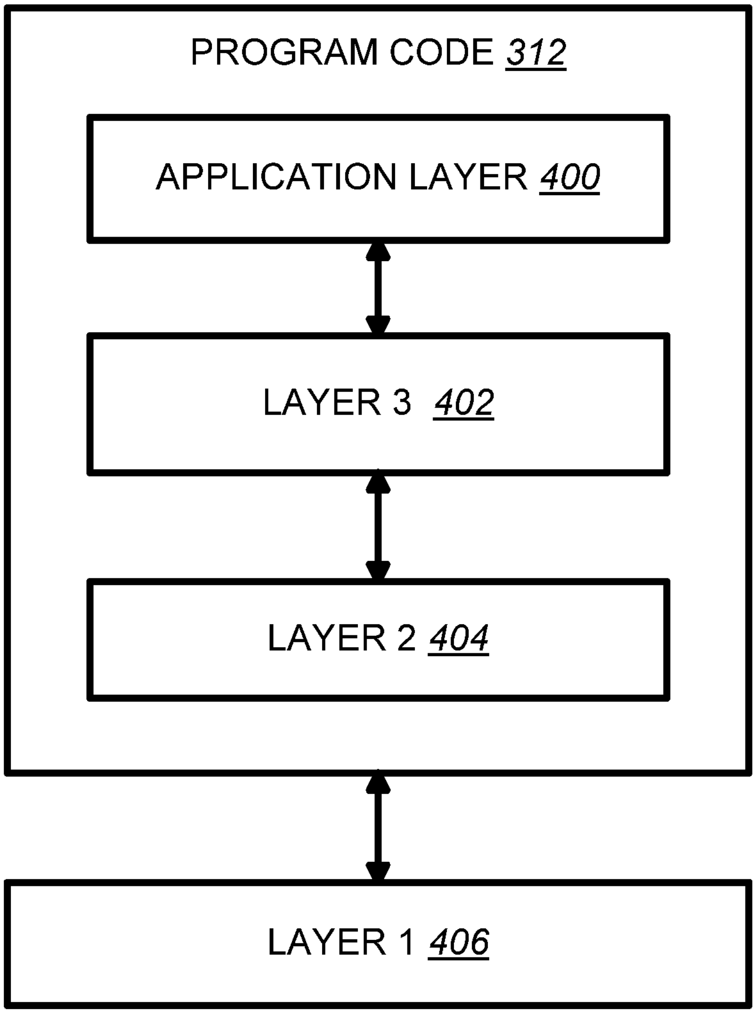
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

3GPP TS 23.287 introduces the following:

5.2.1.4 Unicast Mode Communication Over PC5 Reference Point

Figure 5:
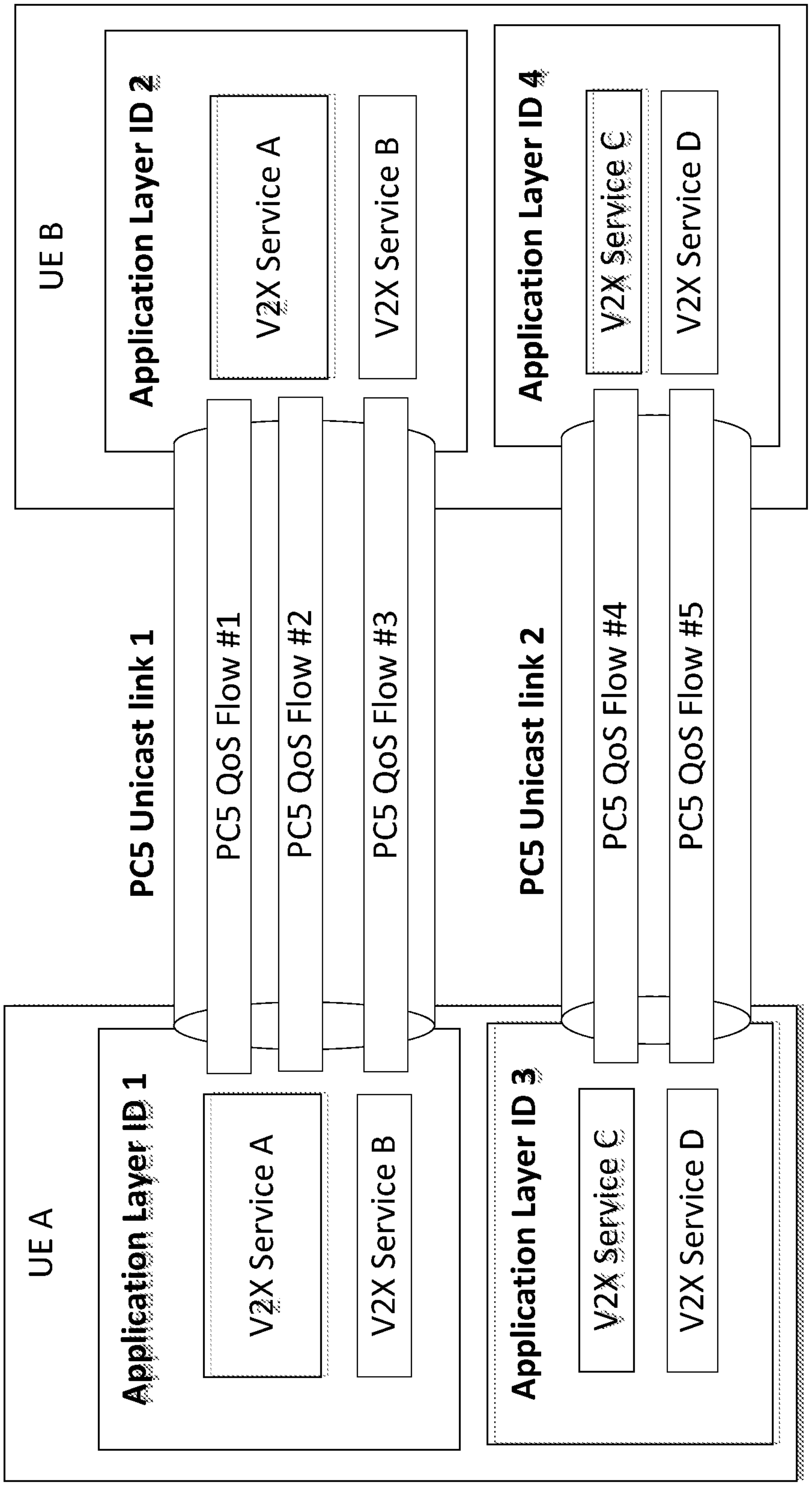
FIG. 5 (PRIOR ART)
FIG. 5 is a reproduction of FIG. 5.2.1.4-1 of 3GPP TS 23.287 V17.0.0.

Unicast mode of communication is only supported over NR based PC5 reference point. FIG. 5.2.1.4-1 illustrates an example of PC5 unicast links.

FIG. 5.2.1.4-1 of 3GPP TS 23.287 V17.0.0, Entitled "Example of PC5 Unicast Links", is Reproduced as FIG. 5

3GPP TS 23.304 introduces the following procedures related to unicast link communication:

5.8.2 Identifiers for 5G ProSe Direct Communication 5.8.2.1 General

Each UE has one or more Layer-2 IDs for 5G ProSe direct communication over PC5 reference point, consisting of:

Source Layer-2 ID(s); and

Destination Layer-2 ID(s).

Source and Destination Layer-2 IDs are included in layer-2 frames sent on the layer-2 link of the PC5 reference point identifying the layer-2 source and destination of these frames. Source Layer-2 IDs are always self-assigned by the UE originating the corresponding layer-2 frames. The selection of the Source and Destination Layer-2 ID(s) by a UE depends on the communication mode of 5G ProSe direct communication over PC5 reference point for this layer-2 link, as described in clauses 5.8.2.2, 5.8.2.3, and 5.8.2.4. The Source Layer-2 IDs may differ between different communication modes.

[ . . . ]

5.8.2.4 Identifiers for Unicast Mode 5G ProSe Direct Communication

For unicast mode of 5G ProSe direct communication over PC5 reference point, the Destination Layer-2 ID used depends on the communication peer. The Layer-2 ID of the communication peer, identified by the peer's Application Layer ID, may be discovered during the establishment of the PC5 unicast link, or known to the UE via prior ProSe direct communications, e.g. existing or prior unicast link to the same Application Layer ID, or obtained from 5G ProSe direct discovery process. The initial signalling for the establishment of the PC5 unicast link may use the known Layer-2 ID of the communication peer, or a default destination Layer-2 ID associated with the ProSe service (i.e. ProSe identifier) configured for PC5 unicast link establishment, as specified in clause 5.1.3.1. During the PC5 unicast link establishment procedure, Layer-2 IDs are exchanged, and should be used for future communication between the two UEs, as specified in clause 6.4.3.

The UE maintains a mapping between the Application Layer IDs and the source Layer-2 IDs used for the PC5 unicast links, as the ProSe application layer does not use the Layer-2 IDs. This allows the change of source Layer-2 ID without interrupting the ProSe applications.

When Application Layer IDs change, the source Layer-2 ID(s) of the PC5 unicast link(s) shall be changed if the link(s) was used for 5G ProSe communication with the changed Application Layer IDs.

Based on privacy configuration as specified in clause 5.1.3.1, the update of the new identifiers of a source UE to the peer UE for the established unicast link may cause the peer UE to change its Layer-2 ID and optionally IP address/prefix if IP communication is used as defined in clause 6.4.3.2.

[ . . . ]

6.3.2 5G ProSe Direct Discovery Procedures Over PC5 Reference Point 6.3.2.1 General A PC5 communication channel is used to carry the discovery message over PC5 and the discovery message over PC5 is differentiated from other PC5 messages by AS layer. Both Model A and Model B discovery as defined in TS 23.303 [3] are supported:

Model A uses a single discovery protocol message (Announcement).

Model B uses two discovery protocol messages (Solicitation and Response).

Figure 6:
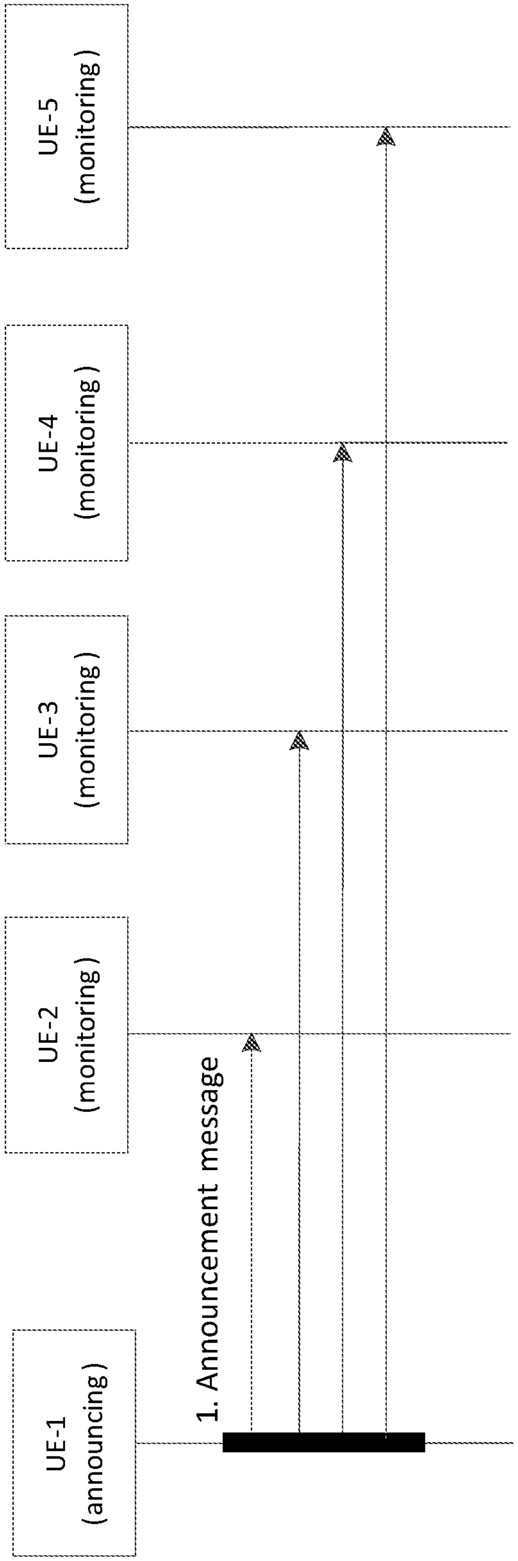
FIG. 6 (PRIOR ART)
FIG. 6 is a reproduction of FIG. 6.3.2.1-1 of 3GPP TS 23.304 V17.2.1.

Depicted in FIG. 6.3.2.1-1 is the procedure for 5G ProSe Direct Discovery with Model A.

FIG. 6.3.2.1-1 of 3GPP TS 23.304 V17.2.1, Entitled "5G ProSe Direct Discovery with Model A", is Reproduced as FIG. 6

1. The Announcing UE sends an Announcement message. The Announcement message may include the Type of Discovery Message, ProSe Application Code or ProSe Restricted Code, security protection element, [metadata information]. The Application layer metadata information may be included as metadata in the Announcement message.

The Destination Layer-2 ID and Source Layer-2 ID used to send the Announcement message are specified in clause 5.8.1.2 and clause 5.8.1.3.

The Monitoring UE determines the Destination Layer-2 ID for signalling reception. The Destination Layer-2 ID is configured with the UE(s) as specified in clause 5.8.1.2.

Depicted in FIG. 6.3.2.1-2 is the procedure for 5G ProSe Direct Discovery with Model B.

Figure 7:
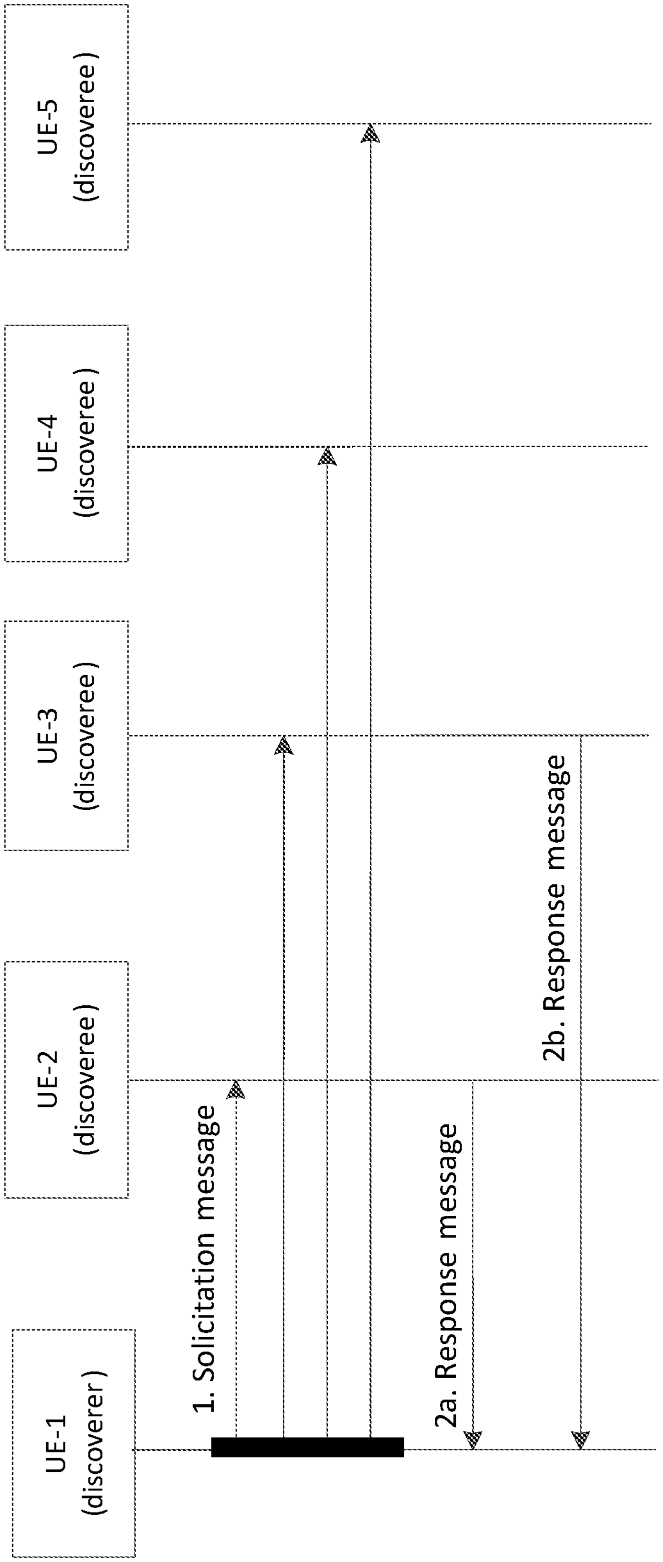
FIG. 7 (PRIOR ART)
FIG. 7 is a reproduction of FIG. 6.3.2.1-2 of 3GPP TS 23.304 V17.2.1.

FIG. 6.3.2.1-2 of 3GPP TS 23.304 V17.2.1, Entitled "5G ProSe Direct Discovery with Model B", is Reproduced as FIG. 7

1. The Discoverer UE sends a Solicitation message. The Solicitation message may include Type of Discovery Message, ProSe Query Code, security protection element.
   The Destination Layer-2 ID and Source Layer-2 ID used to send the Solicitation message are specified in clause 5.8.1.2 and clause 5.8.1.3.
   How the Discoveree UE determines the Destination Layer-2 ID for signalling reception is specified in clause 5.8.1.2.
2. The Discoveree UE that matches the solicitation message responds to the Discoverer UE with the Response message. The Response message may include Type of Discovery Message, ProSe Response Code, security protection element, [metadata information].
   The Application layer metadata information may be included as metadata in the Response message.
   The Source Layer-2 ID used to send the Response message is specified in clause 5.8.1.3.
   The Destination Layer-2 ID is set to the Source Layer-2 ID of the received Solicitation message.

NOTE: Details of security protection element will be defined by SA WG3.

[. . . ]

6.4.3 Unicast Mode 5G ProSe Direct Communication 6.4.3.1 Layer-2 Link Establishment Over PC5 Reference Point To perform unicast mode of ProSe Direct communication over PC5 reference point, the UE is configured with the related information as described in clause 5.1.3.

FIG. 6.4.3.1-1 shows the layer-2 link establishment procedure for the unicast mode of ProSe Direct communication over PC5 reference point.

Figure 8:
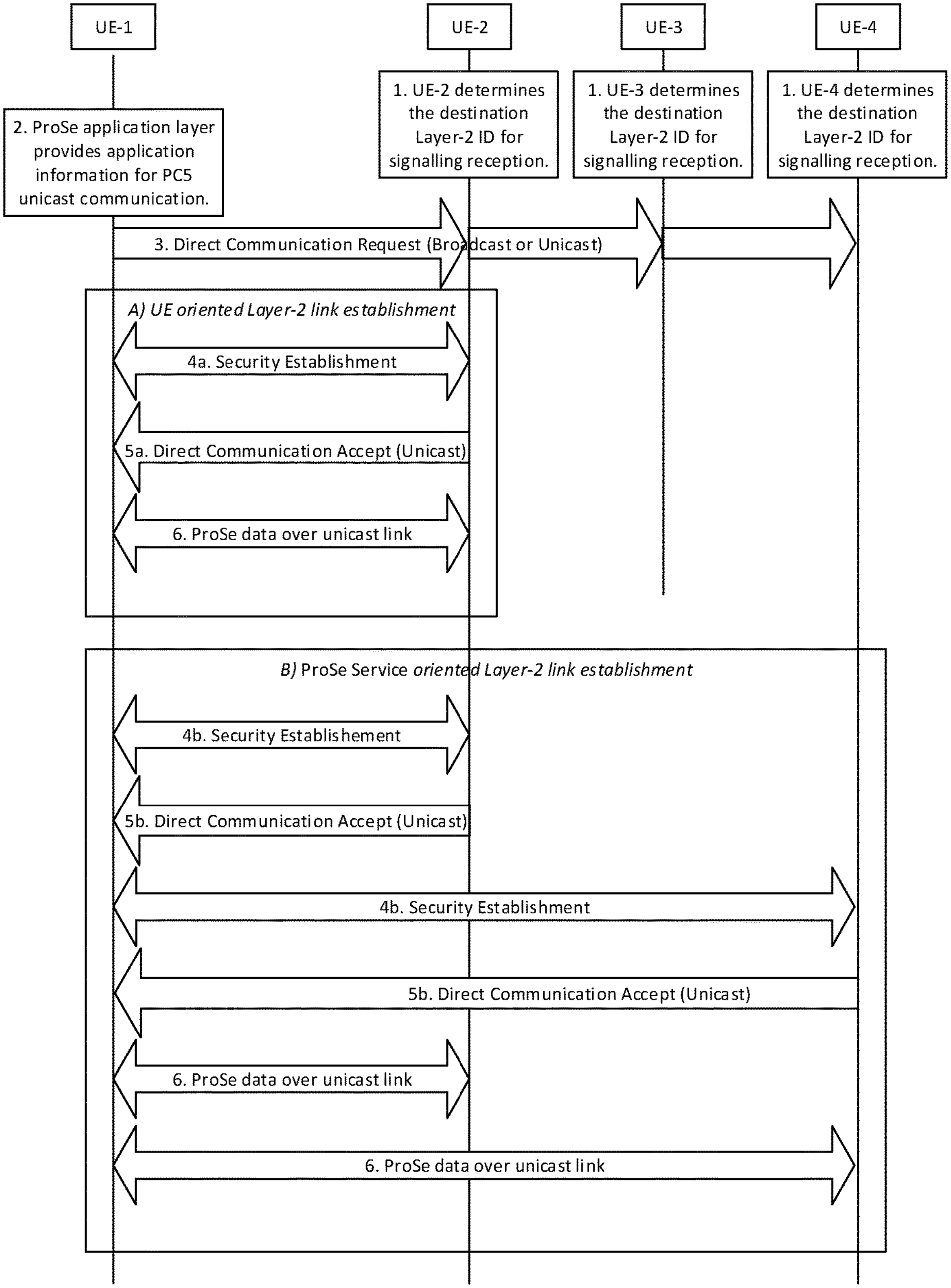
FIG. 8 (PRIOR ART)
FIG. 8 is a reproduction of FIG. 6.4.3.1-1 of 3GPP TS 23.304 V17.2.1.

FIG. 6.4.3.1-1 of 3GPP TS 23.304 V17.2.1, Entitled "Layer-2 Link Establishment Procedure", is Reproduced as FIG. 8

1. The UE(s) determine the destination Layer-2 ID for signalling reception for PC5 unicast link establishment as specified in clause 5.8.2.4.
2. The ProSe application layer in UE-1 provides application information for PC5 unicast communication. The application information includes the ProSe Service Info, UE's Application Layer ID. The target UE's Application Layer ID may be included in the application information.
   The ProSe application layer in UE-1 may provide ProSe Application Requirements for this unicast communication. UE-1 determines the PC5 QoS parameters and PFI as specified in clause 5.6.1.
   If UE-1 decides to reuse the existing PC5 unicast link as specified in clause 5.3.4, the UE triggers the Layer-2 link modification procedure as specified in clause 6.4.3.4.
3. UE-1 sends a Direct Communication Request message to initiate the unicast layer-2 link establishment procedure. The Direct Communication Request message includes:
   Source User Info: the initiating UE's Application Layer ID (i.e. UE-1's Application Layer ID).
   If the ProSe application layer provided the target UE's Application Layer ID in step 2, the following information is included:
   Target User Info: the target UE's Application Layer ID (i.e. UE-2's Application Layer ID).
   ProSe Service Info: the information about the ProSe identifier(s) requesting Layer-2 link establishment.
   Security Information: the information for the establishment of security.

NOTE 1: The Security Information and the necessary protection of the Source User Info and Target User Info are defined by SA WG3.

The source Layer-2 ID and destination Layer-2 ID used to send the Direct Communication Request message are determined as specified in clauses 5.8.2.1 and 5.8.2.4. The destination Layer-2 ID may be broadcast or unicast Layer-2 ID. When unicast Layer-2 ID is used, the Target User Info shall be included in the Direct Communication Request message.
   UE-1 sends the Direct Communication Request message via PC5 broadcast or unicast using the source Layer-2 ID and the destination Layer-2 ID.
4. Security with UE-1 is established as below:
   4a. If the Target User Info is included in the Direct Communication Request message, the target UE, i.e. UE-2, responds by establishing the security with UE-1.
   4b. If the Target User Info is not included in the Direct Communication Request message, the UEs that are interested in using the announced ProSe Service(s) over a PC5 unicast link with UE-1 responds by establishing the security with UE-1.

NOTE 2: The signalling for the Security Procedure is defined by SA WG3.

When the security protection is enabled, UE-1 sends the following information to the target UE:
   If IP communication is used:
      IP Address Configuration: For IP communication, IP address configuration is required for this link and indicates one of the following values:
         "DHCPv4 server" if only IPv4 address allocation mechanism is supported by the initiating UE, i.e., acting as a DHCPv4 server; or
         "IPv6 Router" if only IPv6 address allocation mechanism is supported by the initiating UE, i.e., acting as an IPv6 Router; or
         "DHCPv4 server & IPv6 Router" if both IPv4 and IPv6 address allocation mechanism are supported by the initiating UE; or
         "address allocation not supported" if neither IPv4 nor IPv6 address allocation mechanism is supported by the initiating UE.
      Link-Local IPv6 Address: a link-local IPv6 address formed locally based on RFC 4862 [17] if UE-1 does not support the IPv6 IP address allocation mechanism, i.e. the IP Address Configuration indicates"address allocation not supported".
   QoS Info: the information about PC5 QoS Flow(s). For each PC5 QoS Flow, the PFI and the corresponding PC5 QoS parameters (i.e. PQI and conditionally other parameters such as MFBR/GFBR, etc.) and optionally the associated ProSe identifier(s).
   Optional PC5 QoS Rule(s).

The source Layer-2 ID used for the security establishment procedure is determined as specified in clauses 5.8.2.1 and 5.8.2.4. The destination Layer-2 ID is set to the source Layer-2 ID of the received Direct Communication Request message.

Upon receiving the security establishment procedure messages, UE-1 obtains the peer UE's Layer-2 ID for future communication, for signalling and data traffic for this unicast link.

5. A Direct Communication Accept message is sent to UE-1 by the target UE(s) that has successfully established security with UE-1:
   5a. (UE oriented Layer-2 link establishment) If the Target User Info is included in the Direct Communication Request message, the target UE, i.e. UE-2 responds with a Direct Communication Accept message if the Application Layer ID for UE-2 matches.
   5b. (ProSe Service oriented Layer-2 link establishment) If the Target User Info is not included in the Direct Communication Request message, the UEs that are interested in using the announced ProSe Service(s) respond to the request by sending a Direct Communication Accept message (UE-2 and UE-4 in FIG. 6.4.3.1-1).

The Direct Communication Accept message includes:
   Source User Info: Application Layer ID of the UE sending the Direct Communication Accept message.
   QoS Info: the information about PC5 QoS Flow(s). For each PC5 QoS Flow, the PFI and the corresponding PC5 QoS parameters requested by UE-1 (i.e. PQI and conditionally other parameters such as MFBR/GFBR, etc.) and optionally the associated ProSe identifiers(s).
   Optional PC5 QoS Rule(s).
   If IP communication is used:
      IP Address Configuration: For IP communication, IP address configuration is required for this link and indicates one of the following values:
         "DHCPv4 server" if only IPv4 address allocation mechanism is supported by the target UE, i.e., acting as a DHCPv4 server; or
         "IPv6 Router" if only IPv6 address allocation mechanism is supported by the target UE, i.e., acting as an IPv6 Router; or
         "DHCPv4 server & IPv6 Router" if both IPv4 and IPv6 address allocation mechanism are supported by the target UE; or
         "address allocation not supported" if neither IPv4 nor IPv6 address allocation mechanism is supported by the target UE.
      Link-Local IPv6 Address: a link-local IPv6 address formed locally based on RFC 4862 [17] if the target UE does not support the IPv6 IP address allocation mechanism, i.e. the IP Address Configuration indicates "address allocation not supported", and UE-1 included a link-local IPv6 address in the Direct Communication Request message. The target UE shall include a non-conflicting link-local IPv6 address.

If both UEs (i.e. the initiating UE and the target UE) are selected to use link-local IPv6 address, they shall disable the duplicate address detection defined in RFC 4862 [17].

NOTE 3: When either the initiating UE or the target UE indicates the support of IPv6 routing, the corresponding address configuration procedure would be carried out after the establishment of the layer 2 link, and the link-local IPv6 addresses are ignored.

The ProSe layer of the UE that established PC5 unicast link passes the PC5 Link Identifier assigned for the unicast link and the PC5 unicast link related information down to the AS layer. The PC5 unicast link related information includes Layer-2 ID information (i.e. source Layer-2 ID and destination Layer-2 ID). This enables the AS layer to maintain the PC5 Link Identifier together with the PC5 unicast link related information.

6. ProSe data is transmitted over the established unicast link as below:
   The PC5 Link Identifier and PFI are provided to the AS layer, together with the ProSe data. Optionally in addition, the Layer-2 ID information (i.e. source Layer-2 ID and destination Layer-2 ID) is provided to the AS layer.

NOTE 4: It is up to UE implementation to provide the Layer-2 ID information to the AS layer. UE-1 sends the ProSe data using the source Layer-2 ID (i.e. UE-1's Layer-2 ID for this unicast link) and the destination Layer-2 ID (i.e. the peer UE's Layer-2 ID for this unicast link).

NOTE 5: PC5 unicast link is bi-directional, therefore the peer UE of UE-1 can send the ProSe data to UE-1 over the unicast link with UE-1.

3GPP 24.554 introduces the following procedures related to unicast link communication:

7.2.2 5G ProSe Direct Link Establishment Procedure 7.2.2.1 General

Depending on the type of the 5G ProSe direct link establishment procedure (i.e., UE oriented layer-2 link establishment or ProSe service oriented layer-2 link establishment in 3GPP TS 23.304 [2]), the 5G ProSe direct link establishment procedure is used to establish a 5G ProSe direct link between two UEs or to establish multiple 5G ProSe direct links. The UE sending the request message is called the "initiating UE" and the other UE is called the "target UE". If the request message does not indicate the specific target UE (i.e., target user info is not included in the request message), and multiple target UEs are interested in the ProSe application(s) indicated in the request message, then the initiating UE shall handle corresponding response messages received from those target UEs. The maximum number of 5G ProSe direct links established in a UE at a time shall not exceed an implementation-specific maximum number of established 5G ProSe direct links.

NOTE: The recommended maximum number of established 5G ProSe direct link is 8.

When the 5G ProSe direct link establishment procedure for a 5G ProSe layer-3 remote UE completes successfully, and if there is a PDU session established for relaying the traffic of the remote UE, the 5G ProSe layer-3 UE-to-network relay UE shall perform the remote UE report procedure as specified in 3GPP TS 24.501 [11].

After the 5G ProSe direct link establishment procedure for a 5G ProSe layer-2 remote UE completes successfully, and upon getting a request from the 5G ProSe layer-2 remote UE through lower layers, the 5G ProSe layer-2 UE-to-network relay UE, if in 5GMM-IDLE mode, shall inform lower layers to perform a service request procedure as specified in 3GPP TS 24.501 [11].

Editor's note: Any possible changes to the 5G ProSe direct link establishment procedure due to the security requirements of 5G ProSe layer-2 UE-to-network relay or 5G ProSe layer-3 UE-to-network relay (such as adding new IEs or changing existing IEs) are FFS.

7.2.2.2 5G ProSe Direct Link Establishment Procedure Initiation by Initiating UE The initiating UE shall meet the following pre-conditions before initiating this procedure:

a) a request from upper layers to transmit the packet for ProSe application over PC5;

b) the communication mode is unicast mode (e.g., pre-configured as specified in clause 5.2.4 or indicated by upper layers);

c) the link layer identifier for the initiating UE (i.e., layer-2 ID used for unicast communication) is available (e.g., pre-configured or self-assigned) and is not being used by other existing 5G ProSe direct links within the initiating UE;

d) the link layer identifier for the destination UE (i.e., the unicast layer-2 ID of the target UE or the broadcast layer-2 ID) is available to the initiating UE (e.g., pre-configured, obtained as specified in clause 5.2 or known via prior ProSe direct communication);

NOTE 1: In the case where different ProSe applications are mapped to distinct default destination layer-2 IDs, when the initiating UE intends to establish a single unicast link that can be used for more than one ProSe identifiers, the UE can select any of the default destination layer-2 ID for unicast initial signalling.

e) the initiating UE is either authorised for 5G ProSe direct communication over PC5 in NR-PC5 in the serving PLMN, has a valid authorization for 5G ProSe direct communication over PC5 in NR-PC5 when not served by NG-RAN, or is authorized to use a 5G ProSe UE-to-network relay UE. The UE considers that it is not served by NG-RAN if the following conditions are met:

1) not served by NG-RAN for ProSe direct communication over PC5;

2) in limited service state as specified in 3GPP TS 23.122 [14], if the reason for the UE being in limited service state is one of the following;

i) the UE is unable to find a suitable cell in the selected PLMN as specified in 3GPP TS 38.304 [15];

ii) the UE received a REGISTRATION REJECT message or a SERVICE REJECT message with the 5GMM cause #11 "PLMN not allowed" as specified in 3GPP TS 24.501 [11]; or iii) the UE received a REGISTRATION REJECT message or a SERVICE REJECT message with the 5GMM cause #7 "5GS services not allowed" as specified in 3GPP TS 24.501 [11]; or 3) in limited service state as specified in 3GPP TS 23.122 [14] for reasons other than i), ii) or iii) above, and located in a geographical area for which the UE is provisioned with "non-operator managed" radio parameters as specified in clause 5.2;

f) there is no existing 5G ProSe direct link for the pair of peer application layer IDs, or there is an existing 5G ProSe direct link for the pair of peer application layer IDs and:

1) the network layer protocol of the existing 5G ProSe direct link is not identical to the network layer protocol required by the upper layer in the initiating UE for this ProSe application;

2) the security policy (either signalling security policy or user plane security policy) corresponding to the ProSe identifier is not compatible with the security policy of the existing 5G ProSe direct link; or 3) in case of the 5G ProSe direct link establishment procedure is for direct communication between the remote UE and the UE-to-network relay UE, the existing 5G ProSe direct link for the peer UE is established with a different RSC or without an RSC;

g) the number of established 5G ProSe direct links is less than the implementation-specific maximum number of established 5G ProSe direct links allowed in the UE at a time; and h) timer T5088 is not associated with the link layer identifier for the destination UE or timer T5088 associated with the link layer identifier for the destination UE has already expired or stopped.

After receiving the service data or request from the upper layers, the initiating UE shall derive the PC5 QoS parameters and assign the PQFI(s) for the PC5 QoS flows(s) to be established as specified in clause 7.2.7.

In order to initiate the 5G ProSe direct link establishment procedure, the initiating UE shall create a PROSE DIRECT LINK ESTABLISHMENT REQUEST message. The initiating UE:

a) shall include the source user info set to the initiating UE's application layer ID received from upper layers;

b) shall include the ProSe identifier(s) received from upper layer if the 5G ProSe direct link establishment procedure is not for 5G ProSe direct communication between the remote UE and the UE-to-network relay UE;

c) shall include the target user info set to the target UE's application layer ID if received from upper layers, or to the identity of the 5G ProSe UE-to-network relay UE obtained during the 5G ProSe UE-to-network relay discovery procedure, or if the destination layer-2 ID is the unicast layer-2 ID of target UE;

d) shall include the key establishment information container if the UE PC5 unicast signalling integrity protection policy is set to "Signalling integrity protection required" or "Signalling integrity protection preferred", and may include the key establishment information container if the UE PC5 unicast signalling integrity protection policy is set to "Signalling integrity protection not needed";

NOTE 2: The key establishment information container is provided by upper layers.

e) shall include a Nonce_1 set to the 128-bit nonce value generated by the initiating UE for the purpose of session key establishment over this 5G ProSe direct link if the UE PC5 unicast signalling integrity protection policy is set to "Signalling integrity protection required" or "Signalling integrity protection preferred";

f) shall include its UE security capabilities indicating the list of algorithms that the initiating UE supports for the security establishment of this 5G ProSe direct link;

g) shall include the most significant 8 bits (MSB) of $K_{NRP\text{-}sess}$ ID chosen by the initiating UE as specified in 3GPP TS 33.503 [34] if the UE PC5 unicast signalling integrity protection policy is set to "Signalling integrity protection required" or "Signalling integrity protection preferred";

h) may include a $K_{NRP}$ ID if the initiating UE has an existing $K_{NRP}$ for the target UE;

i) shall include its UE PC5 unicast signalling security policy. In the case where the different ProSe applications are mapped to the different PC5 unicast signalling security policies, when the initiating UE intends to establish a single unicast link that can be used for more than one ProSe application, each of the signalling security polices of those ProSe applications shall be compatible, e.g., “Signalling integrity protection not needed” and “Signalling integrity protection required” are not compatible. In case the 5G ProSe direct link establishment procedure is for direct communication between 5G ProSe layer-3 remote UE and 5G ProSe layer-3 UE-to-network relay UE, the Signalling integrity protection policy shall be set to “Signalling integrity protection required”;

j) shall include the Relay service code IE set to the relay service code of the target relay UE if the 5G ProSe direct link establishment procedure is for direct communication between the 5G ProSe remote UE and the 5G ProSe UE-to-network relay UE; and h) shall include the UE identity IE set to the SUCI of the initiating UE if:
   1) the 5G ProSe direct link establishment procedure is for direct communication between the 5G ProSe layer-3 remote UE and the 5G ProSe layer-3 UE-to-network relay UE; and
   2) the security for 5G ProSe layer-3 relay use the security procedure over control plane as specified in 3GPP TS 33.503 [34].

Editor’s note: It is FFS how the UE determines whether the security for 5G ProSe layer-3 relay uses the security procedure over control plane or the security procedure over user plane as specified in 3GPP TS 33.503 [34].

After the PROSE DIRECT LINK ESTABLISHMENT REQUEST message is generated, the initiating UE shall pass this message to the lower layers for transmission along with the initiating UE’s layer-2 ID for unicast communication and:

a) the destination layer-2 ID used for unicast initial signalling; or
b) the destination layer-2 ID set to the source layer-2 ID of the selected 5G ProSe UE-to-network relay UE during the 5G ProSe UE-to-network relay discovery procedure as defined in clause 8.2.1;

and start timer T5080.

The UE shall not send a new PROSE DIRECT LINK ESTABLISHMENT REQUEST message to the same target UE identified by the same application layer ID while timer T5080 is running. If the target user info IE is not included in the PROSE DIRECT LINK ESTABLISHMENT REQUEST message (i.e., ProSe application oriented 5G ProSe direct link establishment procedure), the initiating UE shall handle multiple PROSE DIRECT LINK ESTABLISHMENT ACCEPT messages, if any, received from different target UEs for the establishment of multiple 5G ProSe direct links before the expiry of timer T5080.

NOTE 3: In order to ensure successful 5G ProSe direct link establishment, T5080 should be set to a value larger than the sum of T5089 and T5092.

Figure 9:
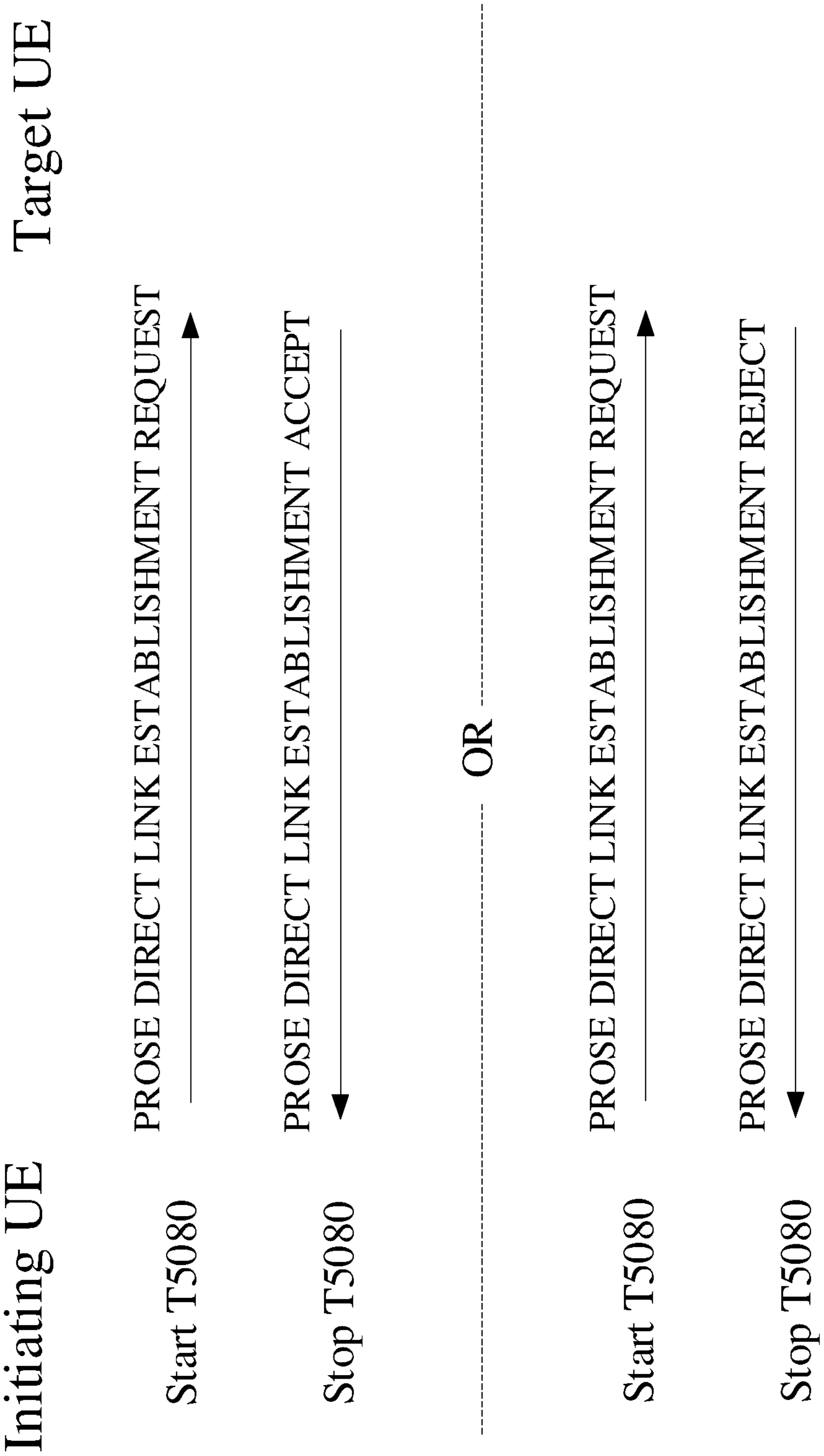
FIG. 9 (PRIOR ART)
FIG. 9 is a reproduction of FIG. 7.2.2.2.1 of 3GPP TS 24.554 V17.0.0.

FIG. 7.2.2.2.1 of 3GPP TS 24.554 V17.0.0, Entitled “UE Oriented 5G ProSe Direct Link Establishment Procedure”, is Reproduced as FIG. 9

[ . . . ]

7.2.2.3 5G ProSe Direct Link Establishment Procedure Accepted by the Target UE

Upon receipt of a PROSE DIRECT LINK ESTABLISHMENT REQUEST message, if the target UE accepts this request, the target UE shall uniquely assign a PC5 link identifier, create a 5G ProSe direct link context.

If the PROSE DIRECT LINK ESTABLISHMENT REQUEST message is not used for 5G ProSe direct communication between the remote UE and the UE-to-network relay UE, the target UE assigns a layer-2 ID for this 5G ProSe direct link. The newly assigned layer-2 ID replaces the target layer-2 ID as received on the PROSE DIRECT LINK ESTABLISHMENT REQUEST message. Then the target UE shall store this assigned layer-2 ID and the source layer-2 ID used in the transport of this message provided by the lower layers in the 5G ProSe direct link context.

The target UE may initiate 5G ProSe direct link authentication procedure as specified in clause 7.2.12 and shall initiate 5G ProSe direct link security mode control procedure as specified in clause 7.2.10.

NOTE 1: It is possible for the target UE to reuse the target UE’s layer-2 ID used in the transport of the PROSE DIRECT LINK ESTABLISHMENT REQUEST message provided by the lower layers in case that the target UE’s layer-2 ID has been used in previous 5G ProSe direct link with the same peer.

If:

a) the target user info IE is included in the PROSE DIRECT LINK ESTABLISHMENT REQUEST message and this IE includes the target UE’s application layer ID; or
b) the target user info IE is not included in the PROSE DIRECT LINK ESTABLISHMENT REQUEST message and the target UE is interested in the ProSe application(s) identified by the ProSe identifier IE in the PROSE DIRECT LINK ESTABLISHMENT REQUEST message;

then the target UE shall either:

a) identify an existing $K_{NRP}$ based on the $K_{NRP}$ ID included in the PROSE DIRECT LINK ESTABLISHMENT REQUEST message; or
b) if $K_{NRP}$ ID is not included in the PROSE DIRECT LINK ESTABLISHMENT REQUEST message, the target UE does not have an existing $K_{NRP}$ for the $K_{NRP}$ ID included in PROSE DIRECT LINK ESTABLISHMENT REQUEST message or the target UE wishes to derive a new $K_{NRP}$, derive a new $K_{NRP}$. This may require performing one or more 5G ProSe direct link authentication procedures as specified in clause 7.2.12.

NOTE 2: How many times the 5G ProSe direct link authentication procedure needs to be performed to derive a new $K_{NRP}$ depends on the authentication method used.

After an existing $K_{NRP}$ was identified or a new $K_{NRP}$ was derived, the target UE shall initiate a 5G ProSe direct link security mode control procedure as specified in clause 7.2.10.

Upon successful completion of the 5G ProSe direct link security mode control procedure, in order to determine whether the PROSE DIRECT LINK ESTABLISHMENT REQUEST message can be accepted or not, in case of IP communication, the target UE checks whether there is at least one common IP address configuration option supported by both the initiating UE and the target UE.

Before sending the PROSE DIRECT LINK ESTABLISHMENT ACCEPT message to the remote UE, the target UE acting as a 5G ProSe layer-3 UE-to-network relay UE shall inform the lower layer to initiate the UE requested PDU session establishment procedure as specified in 3GPP TS 24.501 [11] if:

1) the PDU session for relaying the service associated with the RSC has not been established yet; or
2) the PDU session for relaying the service associated with the RSC has been established but the PDU session type is Unstructured.

If the target UE accepts the 5G ProSe direct link establishment procedure, the target UE shall create a PROSE DIRECT LINK ESTABLISHMENT ACCEPT message. The target UE:

a) shall include the source user info set to the target UE's application layer ID received from upper layers;

b) shall include PQFI(s), the corresponding PC5 QoS parameters and optionally the ProSe identifier(s) that the target UE accepts, if the target UE is not acting as a 5G ProSe layer-2 UE-to-network relay UE;

c) may include the PC5 QoS rule(s) if the target UE is not acting as a 5G ProSe layer-2 UE-to-network relay UE;

d) shall include an IP address configuration IE set to one of the following values if IP communication is used and the target UE is not acting as a 5G ProSe layer-2 UE-to-network relay UE:

1) "DHCPv4 server" if only IPv4 address allocation mechanism is supported by the target UE, i.e., acting as a DHCPv4 server; or 2) "IPv6 router" if only IPv6 address allocation mechanism is supported by the target UE, i.e., acting as an IPv6 router; or 3) "DHCPv4 server & IPv6 Router" if both IPv4 and IPv6 address allocation mechanism are supported by the target UE; or 4) "address allocation not supported" if neither IPv4 nor IPv6 address allocation mechanism is supported by the target UE and the target UE is not acting as a 5G ProSe layer-3 UE-to-network relay UE;

NOTE: The UE doesn't include an IP address configuration IE nor a link local IPv6 address IE, if Ethernet or Unstructured data unit type is used for communication.

e) shall include a link local IPv6 address IE formed locally based on IETF RFC 4862 [16] if IP address configuration IE is set to "address allocation not supported", the received PROSE DIRECT LINK SECURITY MODE COMPLETE message included a link local IPv6 address IE and the target UE is neither acting as a 5G ProSe layer-2 UE-to-network relay UE nor acting as a 5G ProSe layer-3 relay UE; and f) shall include the configuration of UE PC5 unicast user plane security protection based on the agreed user plane security policy, as specified in 3GPP TS 33.503 [34].

After the PROSE DIRECT LINK ESTABLISHMENT ACCEPT message is generated, the target UE shall pass this message to the lower layers for transmission along with the initiating UE's layer-2 ID for unicast communication and the target UE's layer-2 ID for unicast communication, and shall start timer T5090 if at least one of ProSe identifiers for the 5G ProSe direct links satisfies the privacy requirements as specified in clause 5.2.

After sending the PROSE DIRECT LINK ESTABLISHMENT ACCEPT message, the target UE shall provide the following information along with the layer-2 IDs to the lower layer, which enables the lower layer to handle the coming PC5 signalling or traffic data:

a) the PC5 link identifier self-assigned for this 5G ProSe direct link;

b) PQFI(s) and its corresponding PC5 QoS parameters, if available; and c) an indication of activation of the PC5 unicast user plane security protection for the 5G ProSe direct link, if applicable.

If the target UE accepts the 5G ProSe direct link establishment request and the 5G ProSe direct link is established not for 5G ProSe direct communication between the 5G ProSe remote UE and the 5G ProSe UE-to-network relay UE, then the target UE may perform the PC5 QoS flow establishment over 5G ProSe direct link as specified in clause 7.2.7. If the 5G ProSe direct link is established for 5G ProSe direct communication between the 5G ProSe layer-3 remote UE and the 5G ProSe layer-3 UE-to-network relay UE, then the target UE may perform the PC5 QoS flow establishment over 5G ProSe direct link as specified in clause 8.2.6.

7.2.2.4 5G ProSe Direct Link Establishment Procedure Completion by the Initiating UE If the Target user info IE is included in the PROSE DIRECT LINK ESTABLISHMENT REQUEST message, upon receipt of the PROSE DIRECT LINK ESTABLISHMENT ACCEPT message, the initiating UE shall stop timer T5080. If the Target user info IE is not included in the PROSE DIRECT LINK ESTABLISHMENT REQUEST message the initiating UE may keep the timer T5080 running and continue to handle multiple response messages (i.e., the PROSE DIRECT LINK ESTABLISHMENT ACCEPT message) from multiple target UEs.

For each of the PROSE DIRECT LINK ESTABLISHMENT ACCEPT message received, the initiating UE shall uniquely assign a PC5 link identifier and create a 5G ProSe direct link context for each of the 5G ProSe direct link(s). Then the initiating UE shall store the source layer-2 ID and the destination layer-2 ID used in the transport of this message provided by the lower layers in the 5G ProSe direct link context(s) to complete the establishment of the 5G ProSe direct link with the target UE(s). From this time onward the initiating UE shall use the established link(s) for ProSe direct communication over PC5 and additional PC5 signalling messages to the target UE(s).

After receiving the PROSE DIRECT LINK ESTABLISHMENT ACCEPT message, the initiating UE shall delete the old security context it has for the target UE and shall provide the following information along with the layer-2 IDs to the lower layer, which enables the lower layer to handle the coming PC5 signalling or traffic data:

a) the PC5 link identifier self-assigned for this 5G ProSe direct link;

b) PQFI(s) and its corresponding PC5 QoS parameters, if available; and c) an indication of activation of the PC5 unicast user plane security protection for the 5G ProSe direct link, if applicable.

The initiating UE shall start timer T5090 if at least one of ProSe identifiers for the 5G ProSe direct links satisfies the privacy requirements as specified in clause 5.2.

In addition, the initiating UE may perform the PC5 QoS flow establishment over 5G ProSe direct link as specified in clause 7.2.7.

Upon expiry of the timer T5080, if the PROSE DIRECT LINK ESTABLISHMENT REQUEST message did not include the Target user info IE, and the initiating UE received at least one PROSE DIRECT LINK ESTABLISHMENT ACCEPT message, it is up to the UE implementation to consider the 5G ProSe direct link establishment procedure as complete or to restart the timer T5080.

[ . . . ]

7.2.10 5G ProSe Direct Link Security Mode Control Procedure 7.2.10.1 General

The 5G ProSe direct link security mode control procedure is used to establish security between two UEs during a 5G ProSe direct link establishment procedure or a 5G ProSe direct link re-keying procedure. Security is not established if the UE PC5 signalling integrity protection is not activated.

After successful completion of the 5G ProSe direct link security mode control procedure, the selected security algorithms and keys are used to integrity protect and cipher all PC5 signalling messages exchanged over this 5G ProSe direct link between the UEs and the security context can be used to protect all PC5 user plane data exchanged over this 5G ProSe direct link between the UEs. The UE sending the PROSE DIRECT LINK SECURITY MODE COMMAND message is called the "initiating UE" and the other UE is called the "target UE".

Editor's note: Any possible changes to the 5G ProSe direct link security mode control procedure due to the security requirements of 5G ProSe layer-2 UE-to-network relay and 5G ProSe layer-3 UE-to-network relay are FFS and waiting for SA3 conclusion.

7.2.10.2 5G ProSe Direct Link Security Mode Control Procedure Initiation by the Initiating UE The initiating UE shall meet the following pre-conditions before initiating the 5G ProSe direct link security mode control procedure:

a) the target UE has initiated a 5G ProSe direct link establishment procedure toward the initiating UE by sending a PROSE DIRECT LINK ESTABLISHMENT REQUEST message and:
    1) the PROSE DIRECT LINK ESTABLISHMENT REQUEST message:
        i) includes a target user info IE which includes the application layer ID of the initiating UE; or
        ii) does not include a target user info IE and the initiating UE is interested in the ProSe service identified by the ProSe identifier in the PROSE DIRECT LINK ESTABLISHMENT REQUEST message; and
    2) the initiating UE:
        i) has either identified an existing $K_{NRP}$ based on the $K_{NRP}$ ID included in the PROSE DIRECT LINK ESTABLISHMENT REQUEST message or derived a new $K_{NRP}$; or
        ii) has decided not to activate security protection based on its UE 5G ProSe direct signalling security policy and the target UE's 5G ProSe direct signalling security policy; or
b) the target UE has initiated a 5G ProSe direct link re-keying procedure toward the initiating UE by sending a PROSE DIRECT LINK REKEYING REQUEST message and:
    1) if the target UE has included a Re-authentication indication in the PROSE DIRECT LINK REKEYING REQUEST message, the initiating UE has derived a new $K_{NRP}$.

If a new $K_{NRP}$ has been derived by the initiating UE, the initiating UE shall generate the 2 MSBs of $K_{NRP}$ ID to ensure that the resultant $K_{NRP}$ ID will be unique in the initiating UE.

The initiating UE shall select security algorithms in accordance with its UE 5G ProSe direct signalling security policy and the target UE's 5G ProSe direct signalling security policy. If the 5G ProSe direct link security mode control procedure was triggered during a 5G ProSe direct link establishment procedure, the initiating UE shall not select the null integrity protection algorithm if the initiating UE or the target UE's 5G ProSe direct signalling integrity protection policy is set to "Signalling integrity protection required". If the 5G ProSe direct link security mode control procedure was triggered during a 5G ProSe direct link re-keying procedure, the initiating UE:

a) shall not select the null integrity protection algorithm if the integrity protection algorithm currently in use for the 5G ProSe direct link is different from the null integrity protection algorithm;
b) shall not select the null ciphering protection algorithm if the ciphering protection algorithm currently in use for the 5G ProSe direct link is different from the null ciphering protection algorithm;
c) shall select the null integrity protection algorithm if the integrity protection algorithm currently in use is the null integrity protection algorithm; and
d) shall select the null ciphering protection algorithm if the ciphering protection algorithm currently in use is the null ciphering protection algorithm.

Then the initiating UE shall:

a) generate a 128-bit Nonce_2 value;
b) derive $K_{NRP\text{-}sess}$ from $K_{NRP}$, Nonce_2 and Nonce_1 received in the PROSE DIRECT LINK ESTABLISHMENT REQUEST message as specified in 3GPP TS 33.536 [37];
c) derive the NR PC5 encryption key NRPEK and the NR PC5 integrity key NRPIK from $K_{NRP\text{-}sess}$ and the selected security algorithms as specified in 3GPP TS 33.536 [37], and
d) create a PROSE DIRECT LINK SECURITY MODE COMMAND message. In this message, the initiating UE:
    1) shall include the key establishment information container IE if a new $K_{NRP}$ has been derived at the initiating UE and the authentication method used to generate $K_{NRP}$ requires sending information to complete the 5G ProSe direct link authentication procedure;

NOTE: The key establishment information container is provided by upper layers.

2) shall include the MSB of $K_{NRP}$ ID IE if a new $K_{NRP}$ has been derived at the initiating UE;
    3) shall include a Nonce_2 IE set to the 128-bit nonce value generated by the initiating UE for the purpose of session key establishment over this 5G ProSe direct link if the selected integrity protection algorithm is not the null integrity protection algorithm;
    4) shall include the selected security algorithms;
    5) shall include the UE security capabilities received from the target UE in the PROSE DIRECT LINK ESTABLISHMENT REQUEST message or PROSE DIRECT LINK REKEYING REQUEST message;
    6) shall include the UE 5G ProSe direct signalling security policy received from the target UE in the PROSE DIRECT LINK ESTABLISHMENT REQUEST message; and
    7) shall include the LSB of $K_{NRP\text{-}sess}$ ID chosen by the initiating UE as specified in 3GPP TS 33.536 [37] if the selected integrity protection algorithm is not the null integrity protection algorithm.

If the security protection of this 5G ProSe direct link is activated, the initiating UE shall form the $K_{NRP\text{-}sess}$ ID from the MSB of $K_{NRP\text{-}sess}$ ID received in the PROSE DIRECT LINK ESTABLISHMENT REQUEST message or PROSE DIRECT LINK REKEYING REQUEST message and the LSB of $K_{NRP\text{-}sess}$ ID included in the PROSE DIRECT LINK SECURITY MODE COMMAND message. The initiating UE shall use the $K_{NRP\text{-}sess}$ ID to identify the new security context.

After the PROSE DIRECT LINK SECURITY MODE COMMAND message is generated, the initiating UE shall pass this message to the lower layers for transmission along with the initiating UE's layer-2 ID for 5G ProSe direct communication and the target UE's layer-2 ID for 5G ProSe direct communication, NRPIK, NRPEK if applicable, $K_{NRP\text{-}sess}$ ID, the selected security algorithm as specified in TS 33.536 [37]; an indication of activation of the 5G ProSe direct signalling security protection for the 5G ProSe direct link with the new security context, if applicable, and start timer T5089. The initiating UE shall not send a new PROSE DIRECT LINK SECURITY MODE COMMAND message to the same target UE while timer T5089 is running.

NOTE: The PROSE DIRECT LINK SECURITY MODE COMMAND message is integrity protected (and not ciphered) at the lower layer using the new security context.

If the 5G ProSe direct link security mode control procedure was triggered during a 5G ProSe direct link re-keying procedure, the initiating UE shall provide to the lower layers an indication of activation of the 5G ProSe direct user plane security protection for the 5G ProSe direct link with the new security context, if applicable, along with the initiating UE's layer-2 ID for 5G ProSe direct communication and the target UE's layer-2 ID for 5G ProSe direct communication.

Figure 10:
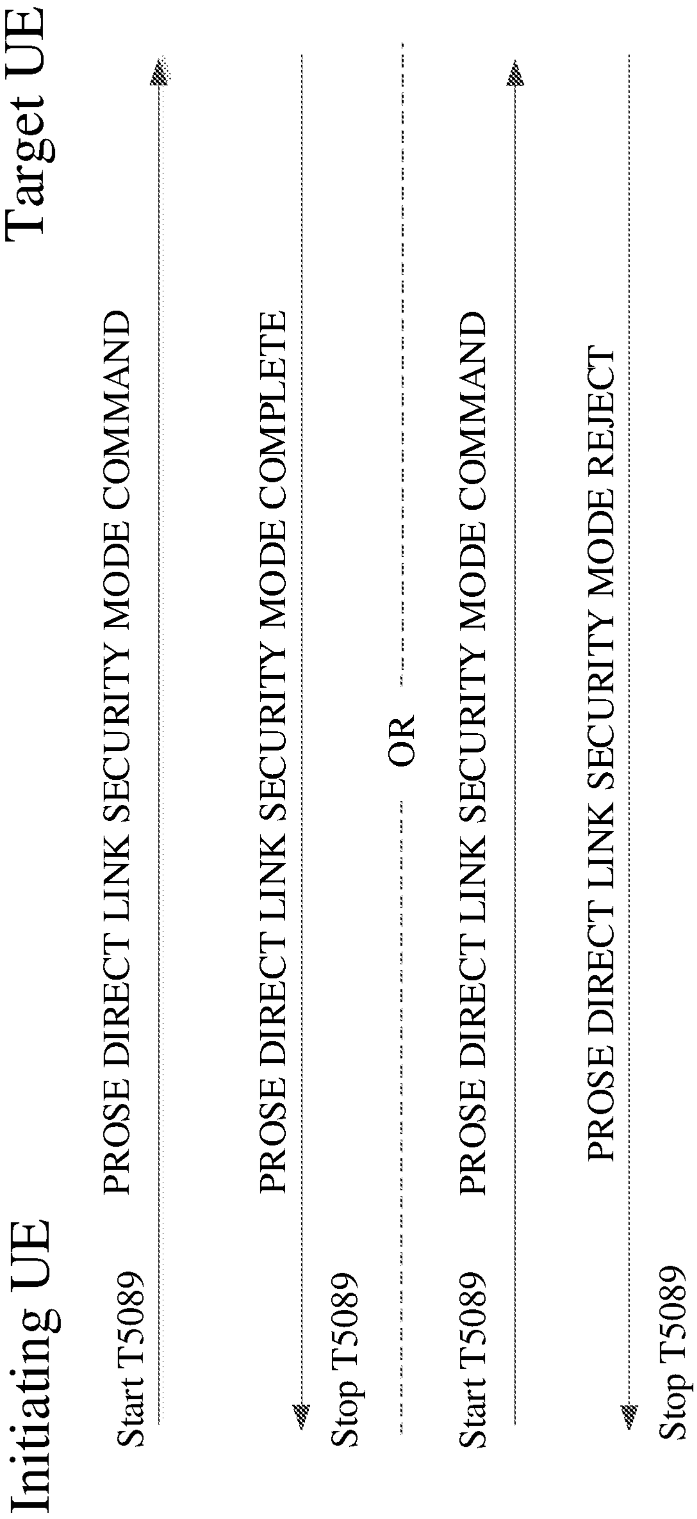
FIG. 10 (PRIOR ART)
FIG. 10 is a reproduction of FIG. 7.2.10.2.1 of 3GPP TS 24.554 V17.0.0.

FIG. 7.2.10.2.1 of 3GPP TS 24.554 V17.0.0, Entitled "5G ProSe Direct Link Security Mode Control Procedure", is Reproduced as FIG. 10

7.2.10.3 5G ProSe Direct Link Security Mode Control Procedure Accepted by the Target UE Upon receipt of a PROSE DIRECT LINK SECURITY MODE COMMAND message, if a new assigned initiating UE's layer-2 ID is included and if the 5G ProSe direct link authentication procedure has not been executed, the target UE shall replace the original initiating UE's layer-2 ID with the new assigned initiating UE's layer-2 ID for 5G ProSe direct communication. The target UE shall check the selected security algorithms IE included in the PROSE DIRECT LINK SECURITY MODE COMMAND message. If "null integrity algorithm" is included in the selected security algorithms IE, the security of this 5G ProSe direct link is not activated. If "null ciphering algorithm" and an integrity algorithm other than "null integrity algorithm" are included in the selected algorithms IE, the signalling ciphering protection is not activated. If the target UE's 5G ProSe direct signalling integrity protection policy is set to "Signalling integrity protection required", the target UE shall check the selected security algorithms IE in the PROSE DIRECT LINK SECURITY MODE COMMAND message does not include the null integrity protection algorithm. If the selected integrity protection algorithm is not the null integrity protection algorithm, the target UE shall:

a) derive $K_{NRP\text{-}sess}$ from $K_{NRP}$, Nonce_1 and Nonce_2 received in the PROSE DIRECT LINK SECURITY MODE COMMAND message as specified in 3GPP TS 33.536 [37]; and
b) derive NRPIK from $K_{NRP\text{-}sess}$ and the selected integrity algorithm as specified in 3GPP TS 33.536 [37].

If the $K_{NRP\text{-}sess}$ is derived and the selected ciphering protection algorithm is not the null ciphering protection algorithm, then the target UE shall derive NRPEK from $K_{NRP\text{-}sess}$ and the selected ciphering algorithm as specified in 3GPP TS 33.536 [37].

The target UE shall determine whether or not the PROSE DIRECT LINK SECURITY MODE COMMAND message can be accepted by:

a) checking that the selected security algorithms in the PROSE DIRECT LINK SECURITY MODE COMMAND message does not include the null integrity protection algorithm if the target UE's 5G ProSe direct signalling integrity protection policy is set to "Signalling integrity protection required";
b) asking the lower layers to check the integrity of the PROSE DIRECT LINK SECURITY MODE COMMAND message using NRPIK and the selected integrity protection algorithm, if the selected integrity protection algorithm is not the null integrity protection algorithm;
c) checking that the received UE security capabilities have not been altered compared to the values that the target UE sent to the initiating UE in the PROSE DIRECT LINK ESTABLISHMENT REQUEST message or PROSE DIRECT LINK REKEYING REQUEST message;
d) if the 5G ProSe direct link security mode control procedure was triggered during a 5G ProSe direct link establishment procedure,
   1) checking that the received UE 5G ProSe direct signalling security policy has not been altered compared to the values that the target UE sent to the initiating UE in the PROSE DIRECT LINK ESTABLISHMENT REQUEST message; and
   2) checking that the LSB of $K_{NRP\text{-}sess}$ ID included in the PROSE DIRECT LINK SECURITY MODE COMMAND message are not set to the same value as those received from another UE in response to the target UE's PROSE DIRECT LINK ESTABLISHMENT REQUEST message; and
e) if the 5G ProSe direct link security mode control procedure was triggered during a 5G ProSe direct link re-keying procedure and the integrity protection algorithm currently in use for the 5G ProSe direct link is different from the null integrity protection algorithm, checking that the selected security algorithms in the PROSE DIRECT LINK SECURITY MODE COMMAND message do not include the null integrity protection algorithm.

If the target UE did not include a $K_{NRP}$ ID in the PROSE DIRECT LINK ESTABLISHMENT REQUEST message, the target UE included a Re-authentication indication in the PROSE DIRECT LINK REKEYING REQUEST message or the initiating UE has chosen to derive a new $K_{NRP}$, the target UE shall derive $K_{NRP}$ as specified in 3GPP TS 33.536 [37]. The target UE shall choose the 2 LSBs of $K_{NRP}$ ID to ensure that the resultant $K_{NRP}$ ID will be unique in the target UE. The target UE shall form $K_{NRP}$ ID from the received MSB of $K_{NRP}$ ID and its chosen LSB of $K_{NRP}$ ID and shall store the complete $K_{NRP}$ ID with $K_{NRP}$.

If the target UE accepts the PROSE DIRECT LINK SECURITY MODE COMMAND message, the target UE shall create a PROSE DIRECT LINK SECURITY MODE COMPLETE message. In this message, the target UE:

a) shall include the PQFI and the corresponding PC5 QoS parameters if the direct communication is not for 5G ProSe direct communication between the 5G ProSe layer-2 remote UE and the 5G ProSe layer-2 UE-to-network relay UE;
b) if IP communication is used and the 5G ProSe direct link security mode control procedure was triggered during a 5G ProSe direct link establishment procedure, shall include an IP address configuration IE set to one of the following values:
   1) "IPv6 router" if IPv6 address allocation mechanism is supported by the target UE, i.e., acting as an IPv6 router; or 2) "address allocation not supported" if IPv6 address allocation mechanism is not supported by the target UE;

c) if IP communication is used, the IP address configuration IE is set to "address allocation not supported" and the 5G ProSe direct link security mode control procedure was triggered during a 5G ProSe direct link establishment procedure, shall include a link local IPv6 address IE formed locally based on IETF RFC 4862 [25];

d) if a new $K_{NRP}$ was derived, shall include the 2 LSBs of $K_{NRP}$ ID; and e) if the 5G ProSe direct link security mode control procedure was triggered during a 5G ProSe direct link establishment procedure, shall include its UE 5G ProSe direct user plane security policy for this 5G ProSe direct link. In the case where the different ProSe services are mapped to the different 5G ProSe direct user plane security policies, when more than one ProSe identifier is included in the PROSE DIRECT LINK ESTABLISHMENT REQUEST message, each of the user plane security polices of those ProSe services shall be compatible, e.g., "user plane integrity protection not needed" and "user plane integrity protection required" are not compatible.

If the selected integrity protection algorithm is not the null integrity protection algorithm, the target UE shall form the $K_{NRP-sess}$ ID from the MSB of $K_{NRP-sess}$ ID it had sent in the PROSE DIRECT LINK ESTABLISHMENT REQUEST message or PROSE DIRECT LINK REKEYING REQUEST message and the LSB of $K_{NRP-sess}$ ID received in the PROSE DIRECT LINK SECURITY MODE COMMAND message. The target UE shall use the $K_{NRP-sess}$ ID to identify the new security context.

After the PROSE DIRECT LINK SECURITY MODE COMPLETE message is generated, the target UE shall pass this message to the lower layers for transmission along with the target UE's layer-2 ID for 5G ProSe direct communication and the initiating UE's layer-2 ID for 5G ProSe direct communication, NRPIK, NRPEK if applicable, $K_{NRP-sess}$ ID, the selected security algorithm as specified in 3GPP TS 33.536 [37], and an indication of activation of the 5G ProSe direct signalling security protection for the 5G ProSe direct link with the new security context, if applicable.

NOTE: The PROSE DIRECT LINK SECURITY MODE COMPLETE message and further 5G ProSe direct signalling messages are integrity protected and ciphered (if applicable) at the lower layer using the new security context.

If the 5G ProSe direct link security mode control procedure was triggered during a 5G ProSe direct link re-keying procedure, the target UE shall provide to the lower layers an indication of activation of the 5G ProSe direct user plane security protection for the 5G ProSe direct link with the new security context, if applicable, along with the initiating UE's layer-2 ID for 5G ProSe direct communication and the target UE's layer-2 ID for 5G ProSe direct communication.

7.2.10.4 5G ProSe Direct Link Security Mode Control Procedure Completion by the Initiating UE Upon receiving a PROSE DIRECT LINK SECURITY MODE COMPLETE message, the initiating UE shall stop timer T5089. If the selected integrity protection algorithm is not the null integrity protection algorithm, the UE checks the integrity of the PROSE DIRECT LINK SECURITY MODE COMPLETE message. If the integrity check passes, the initiating UE shall then continue the procedure which triggered the 5G ProSe direct link security mode control procedure. If the selected integrity protection algorithm is the null integrity protection algorithm, the UE continues the procedure without checking the integrity protection.

After receiving the PROSE DIRECT LINK SECURITY MODE COMPLETE message, the initiating UE shall delete the old security context it has for the target UE.

[ . . . ]

10.3.1 ProSe Direct Link Establishment Request 10.3.1.1 Message Definition

This message is sent by a UE to another peer UE to establish a direct link. See table 10.3.1.1.1.

Message type: PROSE DIRECT LINK ESTABLISHMENT REQUEST

Significance: dual

Direction: UE to peer UE

Table 10.3.1.1.1 of 3GPP TS 24.554 V17.0.0, Entitled "PROSE DIRECT LINK ESTABLISHMENT REQUEST Message Content", is Reproduced as FIG. 11

10.3.2 ProSe Direct Link Establishment Accept 10.3.2.1 Message Definition

This message is sent by a UE to another peer UE to accept the received PROSE DIRECT LINK ESTABLISHMENT REQUEST message. See table 10.3.2.1.1.

Message type: PROSE DIRECT LINK ESTABLISHMENT ACCEPT

Significance: dual

Direction: UE to peer UE

Table 10.3.2.1.1 of 3GPP TS 24.554 V17.0.0, Entitled "PROSE DIRECT LINK ESTABLISHMENT ACCEPT Message Content", is Reproduced as FIG. 12

10.3.13 ProSe Direct Link Security Mode Command 10.3.13.1 Message Definition

This message is sent by a UE to another peer UE when a 5G ProSe direct link security mode control procedure is initiated. See table 10.3.13.1.1.

Message type: PROSE DIRECT LINK SECURITY MODE COMMAND

Significance: dual

Direction: UE to peer UE

Table 10.3.13.1.1 of 3GPP TS 24.554 V17.0.0, Entitled "PROSE DIRECT LINK SECURITY MODE COMMAND Message Content", is Reproduced as FIG. 13

10.3.14 ProSe Direct Link Security Mode Complete 10.3.14.1 Message Definition

This message is sent by a UE to another peer UE to respond to a PROSE DIRECT LINK SECURITY MODE COMMAND message. See table 10.3.14.1.1.

Message type: PROSE DIRECT LINK SECURITY MODE COMPLETE

Significance: dual

Direction: UE to peer UE

Table 10.3.14.1.1 of 3GPP TS 24.554 V17.0.0, Entitled "PROSE DIRECT LINK SECURITY MODE COMPLETE Message Content", is Reproduced as FIG. 14

3GPP TS 38.331 introduces the following:

5.8.9.1 Sidelink RRC reconfiguration 5.8.9.1.1 General

Figure 15:
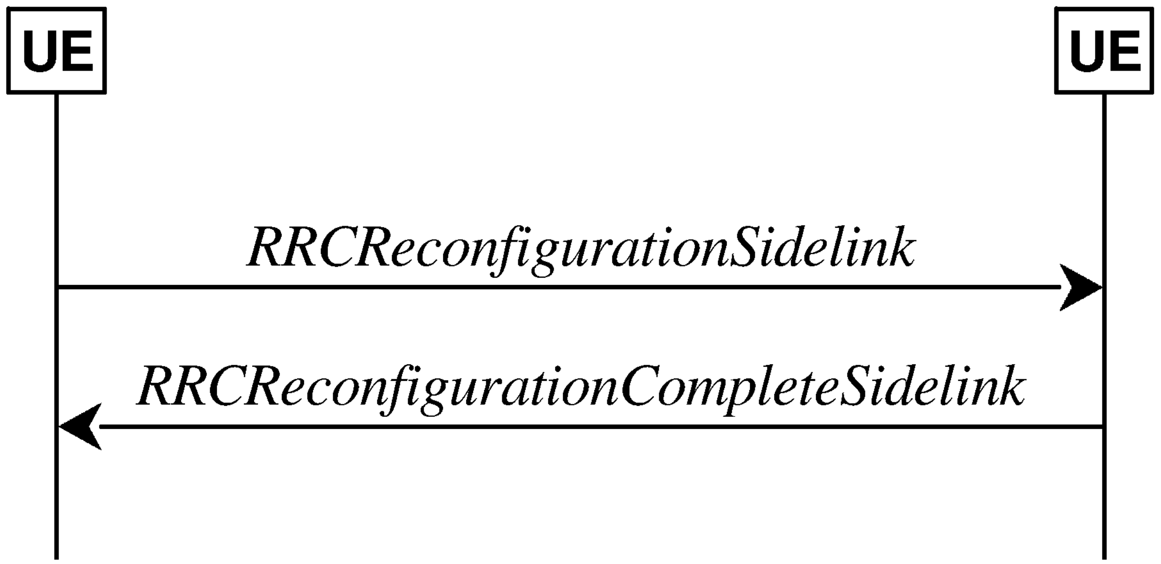
FIG. 15 (PRIOR ART)
FIG. 15 is a reproduction of FIG. 5.8.9.1.1-1 of 3GPP TS 38.331 V17.0.0.

FIG. 5.8.9.1.1-1 of 3GPP TS 38.331 V17.0.0, Entitled "Sidelink RRC Reconfiguration, Successful", is Reproduced as FIG. 15

[ . . . ]

The purpose of this procedure is to modify a PC5-RRC connection, e.g. to establish/modify/release sidelink DRBs, to (re-)configure NR sidelink measurement and reporting, to (re-)configure sidelink CSI reference signal resources and CSI reporting latency bound.

The UE may initiate the sidelink RRC reconfiguration procedure and perform the operation in clause 5.8.9.1.2 on the corresponding PC5-RRC connection in following cases:

the release of sidelink DRBs associated with the peer UE, as specified in clause 5.8.9.1a.1;

the establishment of sidelink DRBs associated with the peer UE, as specified in clause 5.8.9.1a.2;

the modification for the parameters included in SLRB-Config of sidelink DRBs associated with the peer UE, as specified in clause 5.8.9.1a.2;

the release of PC5 Relay RLC channels for L2 U2N Relay UE and Remote UE, as specified in clause 5.8.9.7.1;

the establishment of PC5 Relay RLC channels for L2 U2N Relay UE and Remote UE, as specified in clause 5.8.9.7.2;

the modification for the parameters included in SL-RLC-ChannelConfig-PC5 of PC5 Relay RLC channels for L2 U2N Relay UE and Remote UE, as specified in clause 5.8.9.7.2;

the (re-)configuration of the peer UE to perform NR sidelink measurement and report.

the (re-)configuration of the sidelink CSI reference signal resources and CSI reporting latency bound;

the (re-)configuration of the peer UE to perform sidelink DRX.

In RRC_CONNECTED, the UE applies the NR sidelink communications parameters provided in RRCReconfiguration (if any). In RRC_IDLE or RRC_INACTIVE, the UE applies the NR sidelink communications parameters provided in system information (if any). For other cases, UEs apply the NR sidelink communications parameters provided in SidelinkPreconfigNR (if any). When UE performs state transition between above three cases, the UE applies the NR sidelink communications parameters provided in the new state, after acquisition of the new configurations. Before acquisition of the new configurations, UE continues applying the NR sidelink communications parameters provided in the old state.

3GPP TS 38.323 introduces the following:

5.8 Ciphering and Deciphering

The ciphering function includes both ciphering and deciphering and is performed in PDCP, if configured. The data unit that is ciphered is the MAC-1 (see clause 6.3.4) and the data part of the PDCP Data PDU (see clause 6.3.3) except the SDAP header and the SDAP Control PDU if included in the PDCP SDU. The ciphering is not applicable to PDCP Control PDUs.

[ . . . ]

For NR sidelink communication, the ciphering algorithm and key to be used by the PDCP entity are configured by upper layers as specified in TS 24.587 [16] and the ciphering method shall be applied as specified in TS 33.536 [14].

For NR sidelink communication, the ciphering function is activated for sidelink SRBs (except for SL-SRB0) and/or sidelink DRBs for a PC5 unicast link by upper layers, as specified in TS 38.331 [3]. When security is activated for sidelink SRBs, the ciphering function shall be applied to all PDCP Data PDUs (except for carrying Direct Security Mode Command message as specified in TS 33.536 [14]) for the sidelink SRBs which belong to the PC5 unicast link. When security is activated for sidelink DRBs, the ciphering function shall be applied to all PDCP Data PDUs for the sidelink DRBs which belong to the PC5 unicast link.

For NR sidelink communication, the ciphering and deciphering function as specified in TS 33.536 [14] is applied with KEY (NRPEK), COUNT, BEARER (LSB 5 bits of LCID as specified in TS 38.321 [4]) and DIRECTION (which value shall be set is specified in TS 33.536 [14]) as input.

The ciphering and deciphering are not applied to sidelink SRB4.

3GPP TR 38.836 introduces the following:

3.1 Terms

[ . . . ]

UE-to-UE Relay: A relaying architecture where a Relay UE relays the traffic between a first Remote UE (i.e., source UE) and a second Remote UE (i.e, destination UE).

[ . . . ]

5 Sidelink-Based UE-to-UE Relay 5.1 Scenario, Assumption and Requirement

The UE-to-UE Relay enables the coverage extension of the sidelink transmissions between two sidelink UEs and power saving. The coverage scenarios considered in this study are the following:

1) All UEs (Source UE, Relay UE, Destination UE) are in coverage.
2) All UEs (Source UE, Relay UE, Destination UE) are out-of-coverage.
3) Partial coverage whereby at least one of the UEs involved in relaying (Source UE, Relay UE, Destination UE) is in-coverage, and at least one of the UEs involved in relaying is out-of-coverage.

RAN2 will strive for a common solution to the in- and out-of-coverage cases. For the UE-to-UE Relay, the scenario where UEs can be in coverage of the different cell is supported.

FIGS. 5.1-1 shows the scenarios considered for UE-to-UE Relay. In FIGS. 5.1-1, coverage implies that the Source/Destination UE and/or UE-to-UE Relay UE are in coverage and can access the network on Uu.

Figure 16:
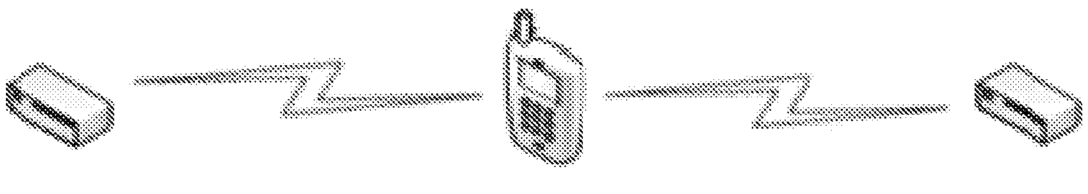
FIG. 16 (PRIOR ART)
FIG. 16 is a reproduction of FIGS. 5.1-1 of 3GPP TR 38.386 V17.0.0.

FIGS. 5.1-1 of 3GPP TR 38.386 V17.0.0, Entitled "Scenarios for UE-to-UE Relay (where the Coverage Status is not Shown)", is Reproduced as FIG. 16

NR sidelink is assumed on PC5 between the Remote UE(s) and the UE-to-UE Relay.

Cross-RAT configuration/control of Source UE, UE-to-UE Relay and Destination UE is not considered, i.e., eNB/ng-eNB do not control/configure an NR Source UE, Destination UE or UE-to-UE Relay UE. For UE-to-UE Relay, this study focuses on unicast data traffic between the Source UE and the Destination UE.

Configuring/scheduling of a UE (Source UE, Destination UE or UE-to-UE Relay UE) by the SN to perform NR sidelink communication is out of scope of this study.

For UE-to-UE Relay, it is assumed that the Remote UE has an active end-to-end connection via only a single Relay UE at a given time.

Relaying of data between a Source UE and a Destination UE can occur once a PC5 link is established between the Source UE, UE-to-UE Relay, and Destination UE.

No restrictions are assumed on the RRC states of any UEs involved in UE-to-UE Relaying.

The requirement of service continuity is only for UE-to-Network Relay, but not for UE-to-UE Relay, during mobility in this release.

[ . . . ]

5.5 Layer-2 Relay 5.5.1 Architecture and Protocol Stack

For L2 UE-to-UE Relay architecture, the protocol stacks are similar to L2 UE-to-Network Relay other than the fact that the termination points are two Remote UEs. The protocol stacks for the user plane and control plane of L2 UE-to-UE Relay architecture are described in FIG. 5.5.1-1 and FIG. 5.5.1-2.

An adaptation layer is supported over the second PC5 link (i.e. the PC5 link between Relay UE and Destination UE) for L2 UE-to-UE Relay. For L2 UE-to-UE Relay, the adaptation layer is put over RLC sublayer for both CP and UP over the second PC5 link. The sidelink SDAP/PDCP and RRC are terminated between two Remote UEs, while RLC, MAC and PHY are terminated in each PC5 link.

Figure 17:
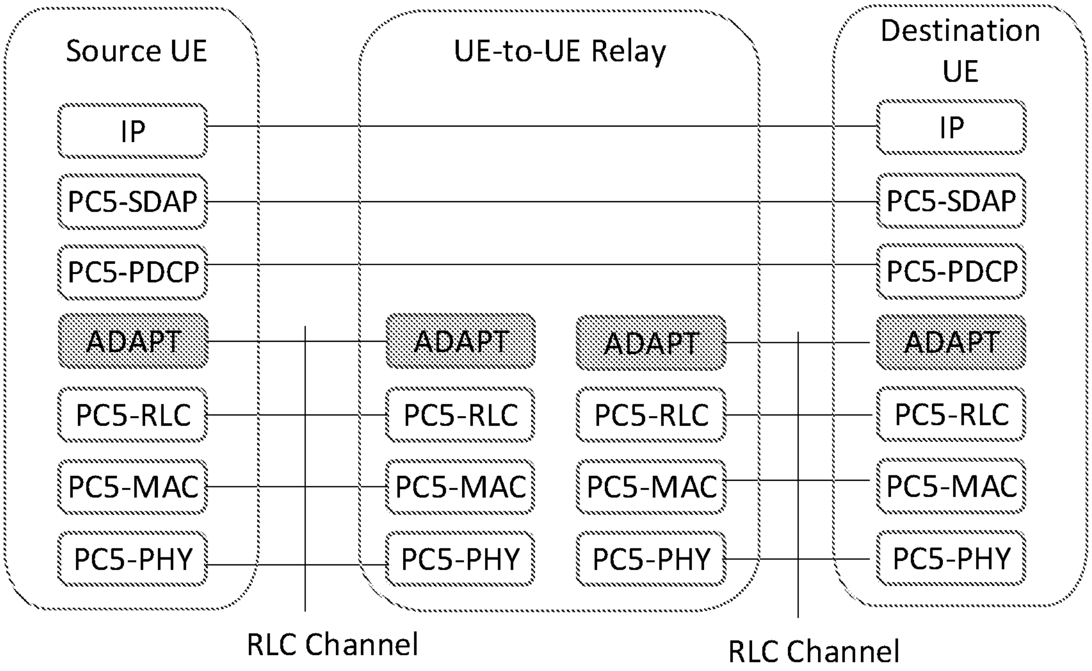
FIG. 17 (PRIOR ART)
FIG. 17 is a reproduction of FIG. 5.5.1-1 of 3GPP TR 38.386 V17.0.0.

FIG. 5.5.1-1 of 3GPP TR 38.386 V17.0.0, Entitled "User Plane Protocol Stack for L2 UE-to-UE Relay", is Reproduced as FIG. 17

Figure 18:
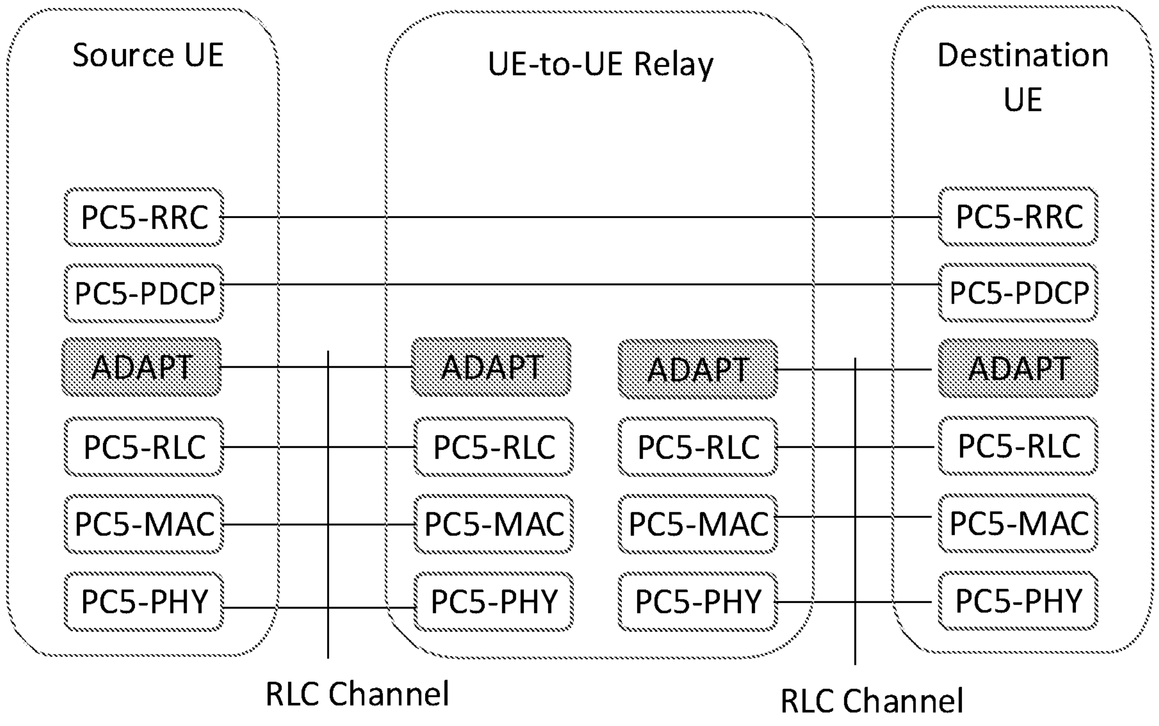
FIG. 18 (PRIOR ART)
FIG. 18 is a reproduction of FIG. 5.5.1-2 of 3GPP TR 38.386 V17.0.0.

FIG. 5.5.1-2 of 3GPP TR 38.386 V17.0.0, Entitled "Control Plane Protocol Stack for L2 UE-to-UE Relay", is Reproduced as FIG. 18

For the first hop of L2 UE-to-UE Relay:

The N:1 mapping is supported by first hop PC5 adaptation layer between Remote UE SL Radio Bearers and first hop PC5 RLC channels for relaying.

The adaptation layer over first PC5 hop between Source Remote UE and Relay UE supports to identify traffic destined to different Destination Remote UEs.

For the second hop of L2 UE-to-UE Relay:

The second hop PC5 adaptation layer can be used to support bearer mapping between the ingress RLC channels over first PC5 hop and egress RLC channels over second PC5 hop at Relay UE.

PC5 Adaptation layer supports the N:1 bearer mapping between multiple ingress PC5 RLC channels over first PC5 hop and one egress PC5 RLC channel over second PC5 hop and supports the Remote UE identification function.

For L2 UE-to-UE Relay:

The identity information of Remote UE end-to-end Radio Bearer is included in the adaptation layer in first and second PC5 hop.

In addition, the identity information of Source Remote UE and/or the identity information of Destination Remote UE are candidate information to be included in the adaptation layer, which are to be decided in WI phase.

3GPP TS 23.700-33 introduces the following:

5.1 Key Issue #1: Support of UE-to-UE Relay 5.1.1 General Description

This key issue intends to support single hop UE-to-UE Relay for unicast as illustrated in FIG. 5.1.1-1, including support for in coverage and out of coverage operation of Source UE, Target UE as well as the UE-to-UE Relay.

Figure 19:
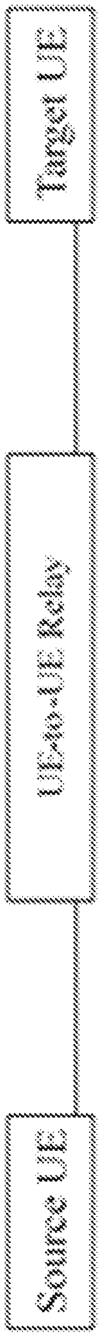
FIG. 19 (PRIOR ART)
FIG. 19 is a reproduction of FIG. 5.1.1-1 of 3GPP TS 23.700-33 V0.2.0.

FIG. 5.1.1-1 of 3GPP TS 23.700-33 V0.2.0, Entitled "Example Scenario of Support of UE-to-UE Relay", is Reproduced as FIG. 19

At least the following aspects need to be studied in potential solutions:

How to discover UE-to-UE Relay(s) and (re)-select a UE-to-UE Relay UE in proximity.

Whether and how the network can control UE-to-UE Relay operation, at least including how to:

Authorize the UE-to-UE Relay, e.g. authorize a UE as UE-to-UE Relay.

Authorize Source/Target UEs to use a UE-to-UE Relay.

Provisioning policy and parameters for UE-to-UE Relay service.

How to establish the connection between the source UE and the target UE via UE-to-UE Relay.

How to provide end-to-end QoS framework to satisfy the QoS requirements (such as data rate, reliability, latency).

How to enhance the system architecture to provide security/privacy protection for a relayed connection.

How to provide a mechanism for a path changing in case of e.g. UE-to-UE Relay changes, including reducing communication disruptions and fulfilling QoS requirements.

Whether and how to determine whether Layer-2 UE-to-UE Relay or Layer-3 UE-to-UE Relay or both are supported by the Source, Target and Relay UEs and how to make sure the Source, Target and Relay UE all use the same type of relay.

NOTE 1: The solution should take into account the forward compatibility for supporting more than one hop in a later release.

NOTE 2: For the involvement of NG-RAN, coordination with RAN WGs is needed.

NOTE 3: For security/privacy protection aspects, coordination with SA WG3 is needed.

NOTE 4: This KI covers both Layer-2 and Layer-3 UE-to-UE relay cases.

[ . . . ]

6.13 Solution #13: Layer-2 UE-to-UE Relay 6.13.1 Description 6.13.1.1 General

Using the solution described in this clause, a UE-to-UE Relay is authorized to relay messages between two UEs over the PC5 interface via authorization and provisioning.

A UE-to-UE Relay enables a source UE and a target UE to establish an end-to-end (E2E) PC5 unicast communication.

The UE-to-UE Relay listens for Direct Communication Request messages from surrounding UEs and, if the specified application matches one of the applications from its provisioned relay policy/parameters, the UE-to-UE Relay advertises it as a relayed application by adding a relay indication (e.g. Relay ID) to the message.

The target UE receives a broadcast Direct Communication Request message with a relay indication.

A secure "extended" (end-to-end) PC5 link is set up between the source UE and the target UE via the UE-to-UE Relay. Source/Target UEs send and receive messages through the UE-to-UE Relay, however, the security association and the extended PC5 unicast link are established end-to-end between the source UE and the target UE. The UE-to-UE Relay forwards the messages transparently, without the ability to read, modify their content or replay them, with the exception of the Direct Communication Request message. As DCR is always sent unprotected the UE-to-UE Relay modifies the message to include the relay indication (e.g. Relay ID). The source/target UEs detect that the link establishment is going through a UE-to-UE Relay upon detecting a relay indication included in the received messages.

A source/target UE uses a unique link (i.e. PC5 unicast link) with a UE-to-UE Relay to send messages to its peer UEs via this specific UE-to-UE Relay. The UE-to-UE Relay receives E2E PC5 messages over this PC5 unicast link and forwards them between the source UE and target UEs using an adaptation layer, which contains information identifying the specific source and/or target UE. The UE-to-UE Relay replaces the identifiers specified in the messages' headers with relay-specific identifiers to "isolate" the PC5 unicast links, i.e. different identifiers are used over each PC5 unicast link.

NOTE 1: Additional security-related parameters and procedures may be needed for the protection of relayed messages using the adaptation layer. Their definitions need to be coordinated with SA WG3.

To enable a single step for direct and indirect link establishment procedure, a source UE (i.e. UE1) sends a DCR message without an adaptation header. A target UE (i.e. UE2) may receive the DCR message directly from the source UE and establish a direct unicast link with the source UE. As well, a UE-to-UE Relay may receive the DCR message and add an adaptation header before forwarding it. Another target UE (i.e. UE3) may receive the DCR message via the UE-to-UE Relay and establish an indirect unicast link with the source UE.

NOTE 2: The details about the identity information of source UE and/or target UE specified in the adaption header will be defined in cooperation with RAN WG2 during normative phase.

Link management (i.e. keep-alive, link modification, link identifier update and link release) is supported over extended PC5 links. Since the security association of extended PC5 links is between the E2E peer UEs, all messages sent over the extended PC5 link, including link management (i.e. PC5-S) messages, may only be processed by those two UEs. No modifications to the keep-alive, link modification and link release procedures are needed when sent over the E2E PC5 link. Modifications for the support of the Link Identifier Update procedure related to extended PC5 links are expected and are specified in another contribution.

The PC5 unicast link, used by source/target UEs to send E2E messages via a specific UE-to-UE Relay, is also used as a management link, i.e. to manage the extended links (e.g. for QoS adaptation or privacy procedure). The management link is secured between the source/target UEs and the UE-to-UE Relay and doesn't make use of an adaptation layer.

6.13.1.2 Control and User Plane Protocol Stacks

The control and user plane protocols stacks are based on the architectural reference model described in Annex A.

6.13.2 Procedures

Connection establishment via a L2 UE-to-UE Relay is done after the discovery procedure (i.e. using Discovery messages as defined in 23.304 [3] clause 6.3) i.e. Models A/B or using the integrated discovery procedure (i.e. using the link establishment procedure as defined in clause 6.4.3.1 of TS 23.304 [3]).

If the discovery procedure is run prior to the link establishment, the source UE determines the UE-to-UE Relay Layer-2 ID to be used to reach the target UE while the target UE Layer-2 ID may be discovered and kept at the UE-to-UE Relay or at the source UE or may not be kept. In the latter case, a broadcast Layer-2 is used when sending the DCR message towards the target UE. In this case, the Target User Info field is used to identify the target UE.

If the integrated discovery mechanism is used, the source UE sends the DCR message to a broadcast Layer-2 ID and the UE-to-UE relay forwards the message using the same value.

FIG. 6.13.2-1 shows the unicast link establishment over PC5 reference point via a Layer-2 UE-to-UE Relay.

Figure 20:
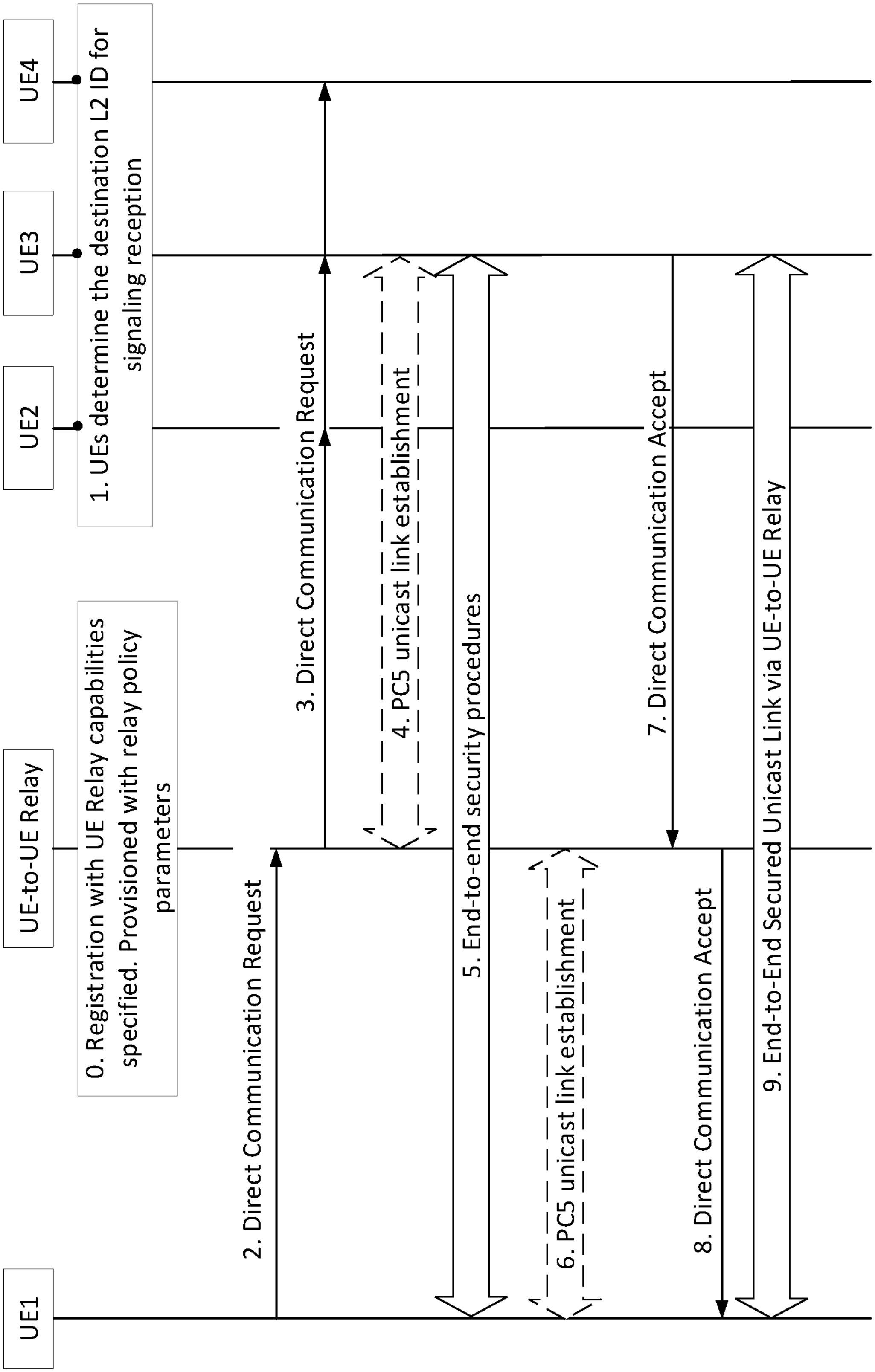
FIG. 20 (PRIOR ART)
FIG. 20 is a reproduction of FIG. 6.13.2-1 of 3GPP TS 23.700-33 V0.2.0.

FIG. 6.13.2-1 of 3GPP TS 23.700-33 V0.2.0, Entitled "Connection Establishment Procedure Via Layer-2 UE-to-UE Relay", is Reproduced as FIG. 20

0. UE-to-UE Relay registers with the network and specifies its relay capabilities. UE-to-UE Relay is provisioned with relay policy parameters from the network.
1. The target UEs (i.e. UE2, UE3 and UE4) determine the destination Layer-2 ID (i.e. broadcast Layer-2 ID) for signalling reception for PC5 unicast link establishment as specified in clause 6.4.3.1 of TS 23.304 [3].
2. On the source UE (i.e. UE1), the application layer provides application information to the ProSe layer for PC5 unicast communication. The application information includes the ProSe Service Info, source UE's Application Layer ID, and may include target UE's Application Layer ID, as specified in TS 23.304 [3] clause 6.4.3.1.

ProSe layer triggers the link establishment procedure by sending a Direct Communication Request (DCR) message which includes:

Source User Info: the initiating UE's Application Layer ID (i.e. UE1's Application Layer ID).

If the ProSe application layer provided the target UE's Application Layer ID in step 2, the following information is included:

Target User Info: the target UE's Application Layer ID (i.e. UE2's Application Layer ID).

ProSe Service Info: the information about the ProSe identifier(s) requesting Layer-2 link establishment.

Security Information: the information for the establishment of security.

The message is sent using the source Layer-2 ID self-assigned by the source UE and the broadcast Layer-2 ID or the discovered UE-to-UE Relay Layer-2 ID as destination, and includes other parameters related to the application offered, as specified in TS 23.304 [3] clause 6.4.3.1. The message may include the target UE Layer-2 ID, if learned during a prior discovery procedure.

The DCR message is sent without an adaptation layer header. This DCR message may be used for direct and/or indirect link establishment. A target UE receiving the DCR directly from UE1 may continue the link establishment procedure as usual.
3. The UE-to-UE Relay receives the Direct Communication Request message and verifies if it's configured to relay this application, i.e. it compares the announce ProSe Service Info with its provisioned relay policy/parameters.

The UE-to-UE Relay forwards the Direct Communication Request message by using its own Layer-2 ID as Source L2 ID and specifies as destination either the target UE Layer-2 ID as specified in the received DCR message or as learned during the prior discovery procedure, or uses the broadcast Layer-2 ID. The UE-to-UE Relay adds an adaptation header containing info identifying UE1. The UE-to-UE Relay additionally includes its unique Relay ID and relay-specific security info. The UE-to-UE Relay keeps the association of UE1 security info as specified in the DCR message and its relay-specific security info as specified with the forwarded DCR message.

NOTE: The UE-to-UE Relay handles DCR message in the ProSe layer. Any subsequent E2E messages (i.e. PC5-S and data) are forwarded based on UE identifier info specified in the adaptation header.

4. Target UE (i.e. UE3) receives the DCR message via the UE-to-UE Relay. UE3 is interested in the announced application thus it triggers a PC5 unicast link establishment with the UE-to-UE Relay, if such a link isn't already established between UE3 and this UE-to-UE Relay. UE3 may receive multiple DCR messages via different UE-to-UE Relays and even directly from UE1. UE3 may select the UE-to-UE Relay based on locally configured rules. UE3 establishes a PC5 unicast link only with the selected UE-to-UE Relay.
5. UE3 continues E2E link establishment procedure by initiating the security procedures (i.e. PC5 Authentication and/or PC5 Direct Security Mode procedures) via the selected UE-to-UE Relay (i.e. over the direct PC5 link to the UE-to-UE Relay). UE3 adds an adaptation header including the info identifying UE1, as received with the DCR message, and UE3 security info and may include a UE3 identifier. UE3 associates the security info received on the DCR message and its UE3 security info to create the security context for the extended link. UE3 includes the Relay ID in the first protected message sent to UE1. The UE-to-UE Relay forwards the messages from UE3 to UE1 including relay-specific info identifying UE3 in the adaptation header. The UE-to-UE Relay also specifies a relay-specific security info associated to UE3 and UE1 security info as received with the DCR message, and finally may include info identifying UE1 and associated with the DCR message (e.g. UE1 Layer-2 ID used by UE1 when sending the DCR message). UE-to-UE Relay puts its Layer-2 ID as the source and UE1 Layer-2 ID as the destination. The UE-to-UE Relay keeps the association of UE3 security info as specified in message received from UE3 and its relay-specific security info associated to UE3.
6. At the reception of this first message from UE3 via the UE-to-UE Relay, UE1 extracts the Relay ID and verifies if a PC5 unicast link is already established between UE1 and this UE-to-UE Relay. If none already exists, UE1 triggers a PC5 unicast link establishment procedure before proceeding security procedures of step 5. UE1 keeps track of the security info specified with the received message (i.e. security info associated to UE3), and uses it to create the security context for the extended link.
7. Once E2E link security establishment procedures are completed, UE3 completes the E2E link establishment procedure via the UE-to-UE Relay by sending a DCA message to UE1.
8. UE1 receives the DCA message. An "extended" unicast link is established between UE1 and UE3, via the UE-to-UE Relay. The extended link may be secured end-to-end, i.e. a security association is created between UE1 and UE3.
9. UE1 and UE3 exchange E2E data via the UE-to-UE Relay, using an adaptation header. The UE-to-UE Relay replaces the fields specified in the adaptation header with relay-specific identifiers, as specified above before forwarding the E2E messages.

Editor's note: The need and details of the E2E authentication and E2E security procedure will be investigated by SA WG3.

Editor's note: The details of the adaptation between two PC5 interfaces are confirmed by RAN WG2.

[ . . . ]

According to 3GPP TS 23.287 and TS 23.304, a UE (e.g. UE1) may perform a PC5 unicast link establishment procedure (e.g. Layer-2 link establishment) with a peer UE (e.g. UE2) for establishing a layer-2 link or a unicast link between these two UEs. Basically, the Layer-2 Identity/Identifier (ID) of the peer UE, identified by the Application Layer ID of the peer UE, may be discovered via discovery messages, during the establishment of the PC5 unicast link, or known to the UE via prior sidelink communications, e.g. existing or prior unicast link to the same Application Layer ID, or obtained from application layer service announcements. The initial signaling for the establishment of the PC5 unicast link (i.e. Direct Communication Request) may use the known Layer-2 ID of the peer UE, or a default destination Layer-2 ID associated with the Proximity-based Services (ProSe) service/application configured for PC5 unicast link establishment. During the PC5 unicast link establishment procedure, Layer-2 IDs of the two UEs are exchanged and used for future communication between the two UEs. In addition, according to 3GPP TS 24.554, the two UEs would exchange security information to each other during the PC5 unicast link establishment so that the two UEs use the negotiated security algorithm and/or key(s) for protection of the content of traffic (including, for example, PC5-S signaling, PC5-RRC signaling and/or PC5 user plane data) sent over the PC5 unicast link.

According to 3GPP TR 23.700-33, UE-to-UE Relay will be supported in sidelink communication, which means one or more than one relay UEs may be used to support data communication between two UEs in case these two UEs cannot communicate with each other directly. For privacy, the content of traffic communicated between the two UEs cannot be read or known by Relay UE(s). Therefore, it is supposed that a security context for protection of user plane (session traffic sent on Sidelink (SL) Data Radio Bearer(s) (DRB(s))) over the two UEs should be isolated from a security context established between a Relay UE and each of these two UEs. It is also supposed that some PC5-S signaling not related to the Relay UE (i.e. these PC5-S signaling sent on SL SRB(s) may be exchanged between UE1 and UE2) could be also protected by the security context established for protection of user plane traffic.

On the other hand, some PC5-S signaling and/or PC5-RRC signaling could be protected by a security context established between a relay UE and each of the two UEs. For example, UE1 and a Relay UE could establish a first security context for protecting some PC5-S signaling and/or PC5-RRC signaling used for control or maintenance of a first leg in a UE-to-UE Relay communication, while UE2 and the Relay UE could establish a second security context for protecting some PC5-S signaling and/or PC5-RRC signaling used for control or maintenance of a second leg in the UE-to-UE Relay communication.

In order to support UE-to-UE relay, in 3GPP TR 38.836, an adaptation layer used for forwarding sidelink packets between Source Remote UE and Destination Remote UE via Relay UE could be supported over the first hop PC5 link (i.e. the PC5 link between Relay UE and Source Remote UE) and the second hop PC5 link (i.e. the PC5 link between Relay UE and Destination Remote UE) for L2 UE-to-UE Relay. For L2 UE-to-UE Relay, the adaptation layer is put over Radio Link Control (RLC) sublayer for both Control Plane (CP) and User Plane (UP) over the first/second hop PC5 link. The sidelink Service Data Adaptation Protocol (SDAP)/Packet Data Convergence Protocol (PDCP) and Radio Resource Control (RRC) are terminated between two Remote UEs, while RLC, Medium Access Control (MAC) and Physical (PHY) are terminated in each PC5 link. The adaptation layer Protocol Data Unit (PDU) sent from Source Remote UE to Relay UE (over the first hop) could include bearer information used for Destination Remote UE to identify traffic belonging to specific SL signalling/data radio bearer. The adaptation layer PDU sent from Source Remote UE to Relay UE (over the first hop) could also include UE information used for Relay UE to identify traffic targeting to specific Destination Remote UE. In addition, the adaptation layer PDU sent from Relay UE to Destination Remote UE (over the second hop) could include bearer information used for Destination Remote UE to identify traffic belonging to specific SL signalling/data radio bearer. The adaptation layer PDU sent from Relay UE to Destination Remote UE (over the second hop) could also include UE information used for Destination Remote UE to identify traffic targeting to specific Source Remote UE.

The bearer information and the UE information could be included in a header of the adaptation layer PDU. Possibly, the UE information in adaptation layer header could be a local UE ID which is different from Layer-2 ID (L2ID) or upper layer ID of Remote UE. In general, length of local UE ID is shorter than length of L2ID, and L2ID and local UE ID are used by Access Stratum (AS) layer for sidelink communication. Thus, it may be required for U2U relay UE, source remote UE and destination remote UE to align with association between local UE ID and L2ID. It is noted that the adaptation layer is put under the PDCP layer, which means content of adaptation layer header is not ciphered and is readable for other UEs because ciphering function is performed in PDCP layer as specified in 3GPP TS 38.323.

According to FIG. 6.13.2-1 (which has been reproduced as FIG. 20 of the present application) and its related statements in Solution #13 of 3GPP TR 23.700-33, a UE-to-UE (U2U) Relay UE can enable a source remote UE (i.e. UE 1 in FIG. 6.13.2-1 of 3GPP TR 23.700-33) and a destination remote UE (i.e. UE3 in FIG. 6.13.2-1 of 3GPP TR 23.700-33) to establish an end-to-end (E2E) PC5 unicast communication via the U2U relay UE. UE1 may send a first Direct Communication Request (DCR) message. The first DCR message may be sent without adaptation layer header. Upon reception of the first DCR message from UE1, the U2U relay UE may send a second DCR message. According to the statement in step 3 in FIG. 6.13.2-1 (which has been reproduced as FIG. 20 of the present application) of 3GPP TR 23.700-33, the U2U relay UE adds an adaptation header containing info identifying UE1 (i.e. local UE ID of UE1), and according to statement in step 5 in FIG. 6.13.2-1 of 3GPP TR 23.700-33, UE3 adds an adaptation header including the info identifying UE 1. In general, when upper layer has packet for transmission, the packet together with source L2ID (of UE sending the packet) and destination L2ID (of UE receiving the packet) will be delivered to lower layer for transmission. Since the Security Mode Command message in step 5 belongs to UE1, (ProSe layer of) UE3 needs to provide UE1's L2ID and the local UE ID for UE1 to AS layer of UE3 for configuring association between UE1's L2ID and the local UE ID for UE1 for adaptation layer usage before initiating step 5. Thus, it is supposed that UE1's L2ID could be included in the second DCR message sent to UE3.

According to 3GPP TS 24.554, the Direct Communication Request message is not sent with security protection. This means the local UE ID for UE 1 in header of an adaptation layer PDU including the second DCR message and the second DCR message including the UE1's L2ID are not ciphered so that the association between the UE1's L2ID and the local UE ID for UE1 is exposed. Given with the clear association between local UE ID and L2ID, hackers would utilize the specific local UE ID in header of adaptation layer PDUs to track the specific UE using specific L2ID. In order to avoid such security issue, the method(s) for establishing association between local UE ID and L2ID could also take this security issue into account. FIG. 1 could illustrate step flow in procedures for establish layer-2 links for U2U relay communication while taking local UE ID allocation into account.

Figure 21:
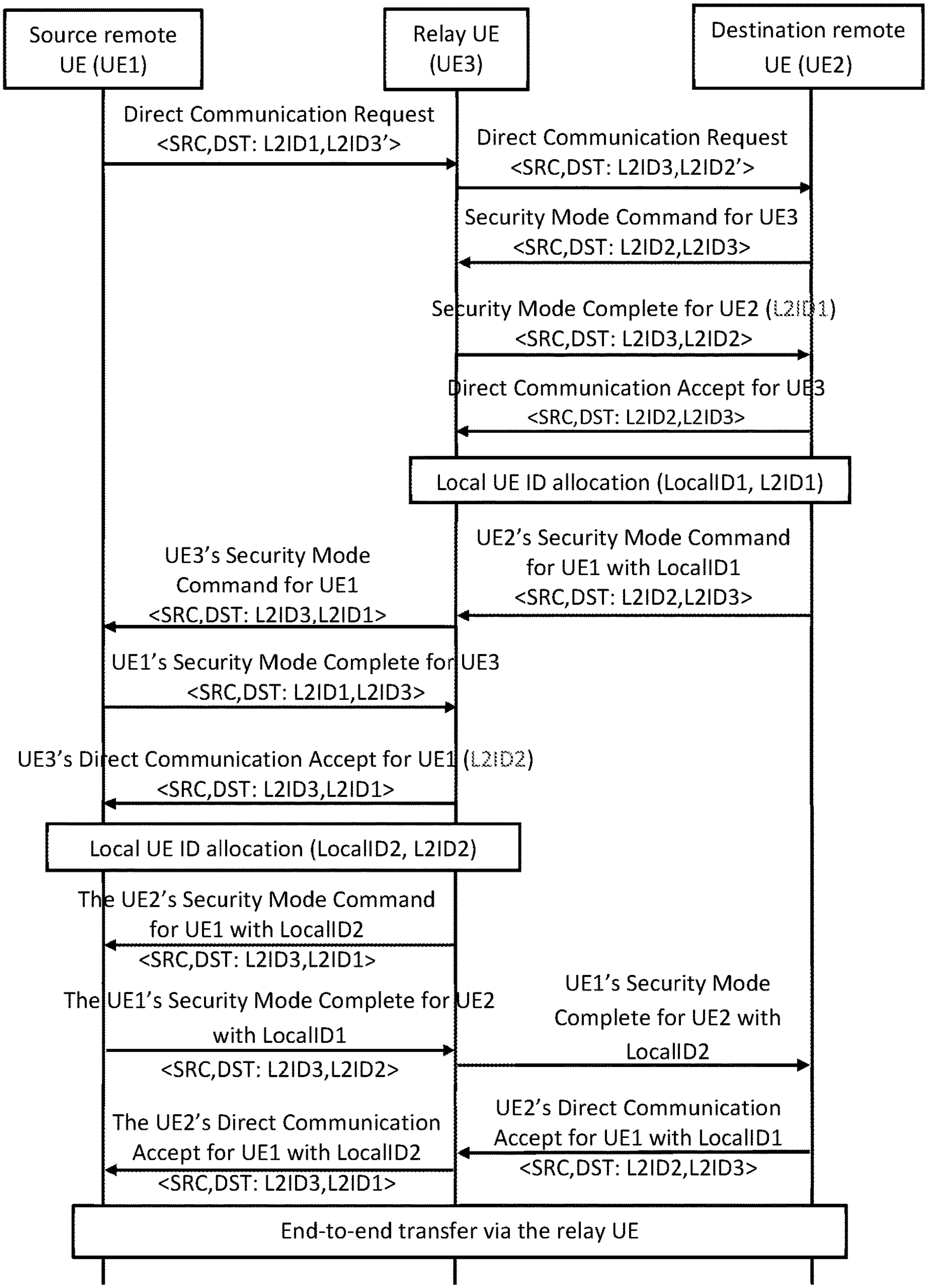
FIG. 21 is a flow diagram according to one exemplary embodiment.

FIG. 21 is a flow diagram according with one exemplary embodiment. In FIG. 21, each PC5-S signaling is sent with tag such as <SRC,DST: L2IDx,L2IDy>, which generally means that the PC5-S signaling is sent via a sidelink frame with L2IDx as Source Layer-2 ID and L2IDy as Destination Layer-2 ID, where L2IDx is a L2ID of UE sending the sidelink frame, and L2IDy is a L2ID of UE receiving the sidelink frame. L2ID1 may be assigned by UEL. L2ID2' and L2ID2 may be assigned by UE2, where L2ID2' may be used for sidelink discovery and L2ID2 may be used for sidelink communication (including transferring PC5-S signaling and/or data traffic). L2ID3' and L2ID3 may be assigned by UE3, where L2ID3' may be used for sidelink discovery and L2ID3 may be used for sidelink communication (including transferring PC5-S signaling and/or data traffic). When UE2 and UE3 establish a layer-2 link, UE2 and UE3 could establish security context (by exchanging Security Mode Command message and Security Mode Complete message between two UEs) for this layer-2 link. The security context may be used for security protection on control plane data (e.g. PC5-S signaling, PC5-RRC signaling) and user plane data transferred over this layer-2 link.

According to 3GPP TS 24.554, the Direct Communication Request message and the Security Mode Command message are not sent with security protection; and starting from the Security Mode Complete message, the following PC5-S signalling (e.g. the Direct Communication Accept message, etc.) and PC5-RRC messages are sent with security protection. Thus, it would be better for UE3 to include/provide UE1's L2ID (i.e. L2ID1) in secured PC5-S signalling (i.e. the Security Mode Complete message) sent to UE2. And then, UE3 and UE2 could initiate a procedure for local UE ID allocation. UE3 could configure UE2 with a local UE ID used for identifying UE1 (e.g. LocalID1) and the L2ID1 (by using e.g. PC5-RRC message, RRCReconfigurationSidelink, etc.). Alternatively, since UE2 is aware of the L2ID1 in the secured PC5-S signalling, UE2 could assign the LocalID1 and configure UE3 with the LocalID1 and the L2ID1 (by using e.g. PC5-RRC message, RRCReconfigurationSidelink, etc.). Given the LocalID1, UE2 could include it in the header of adaptation layer PDU(s) for following sidelink communication (sending/receiving e.g.

UE2's Security Mode Command for UE1, UE1's Security Mode Complete for UE2, UE2's Direct Communication Accept for UE1, E2E PC5-RRC messages, E2E user plane data, and/or etc. via UE3).

Similarly, it would generally be better for UE3 to include/provide UE2's L2ID (i.e. L2ID2) in secured PC5-S signalling (i.e. the Direct Communication Accept message) sent to UE1. And then, UE3 and UE1 could initiate a procedure for local UE ID allocation. UE3 could configure UE1 with a local UE ID used for identifying UE2 (e.g. LocalID2) and the L2ID2 (by using e.g. PC5-RRC message, RRCReconfigurationSidelink, etc.). Alternatively, since UE1 is aware of the L2ID2 in the secured PC5-S signalling, UE1 could assign the LocalID2 and configure UE3 with the LocalID2 and the L2ID2 (by using e.g. PC5-RRC message, RRCReconfigurationSidelink, etc.). Given the LocalID2, UE1 could include it in header of adaptation layer PDU(s) for following sidelink communication (sending/receiving e.g. UE2's Security Mode Command for UE1, UE1's Security Mode Complete for UE2, UE2's Direct Communication Accept for UE1, E2E PC5-RRC messages, E2E user plane data, and/or etc. via UE3).

Figure 22:
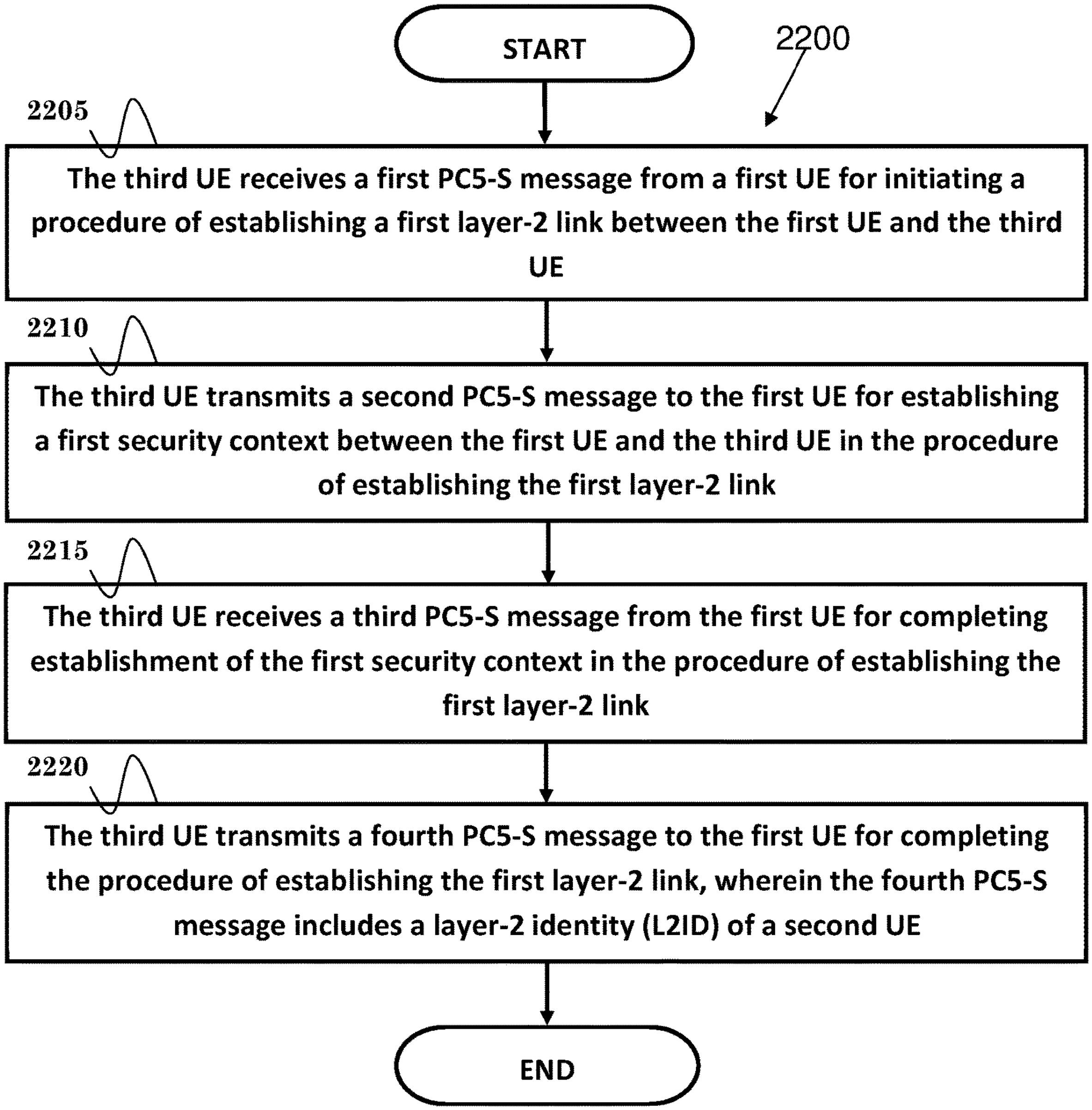
FIG. 22 is a flow chart according to one exemplary embodiment.

FIG. 22 is a flow chart 2200 illustrating an exemplary third UE. In step 2205, the third UE receives a first PC5-S message from a first UE for initiating a procedure of establishing a first layer-2 link between the first UE and the third UE. In step 2210, the third UE transmits a second PC5-S message to the first UE for establishing a first security context between the first UE and the third UE in the procedure of establishing the first layer-2 link. In step 2215, the third UE receives a third PC5-S message from the first UE for completing establishment of the first security context in the procedure of establishing the first layer-2 link. In step 2220, the third UE transmits a fourth PC5-S message to the first UE for completing the procedure of establishing the first layer-2 link, wherein the fourth PC5-S message includes a layer-2 identity (L2ID) of a second UE.

In one embodiment, in response to reception of the first PC5-S message, the third UE could transmit a fifth PC5-S message to the second UE for initiating a procedure of establishing a second layer-2 link between the second UE and the third UE. Furthermore, the third UE could receive a sixth PC5-S message from the second UE for establishing a second security context between the second UE and the third UE in the procedure of establishing the second layer-2 link. The first PC5-S message may contain an upper layer identity or an application layer identity of the second UE. The sixth PC5-S message could be received by using a layer-2 identity of the third UE as Destination L2ID and the L2ID of the second UE as Source L2ID.

In one embodiment, the first UE may be a source remote UE, the second UE may be a target remote UE, and/or the third UE may be a UE-to-UE relay UE. The first PC5-S message may include an upper/application layer identity of the second UE.

In one embodiment, the third UE could transmit a seventh PC5-S message to the second UE for completing establishment of the second security context in the procedure of establishing the second layer-2 link, wherein the seventh PC5-S message includes a layer-2 identity of the first UE. The third UE could receive an eighth PC5-S message from the second UE for completing the procedure of establishing the second layer-2 link.

In one embodiment, the third UE could transmit a first PC5-RRC message to the first UE, wherein the first PC5-RRC message includes the layer-2 identity of the second UE and a second local UE ID for the second UE. The third UE could transmit a second PC5-RRC message to the second UE, wherein the second PC5-RRC message includes the layer-2 identity of the first UE and a first local UE ID for the first UE. The third UE could receive a first PC5-RRC message from the first UE, wherein the first PC5-RRC message includes the layer-2 identity of the second UE and a second local UE ID for the second UE. The third UE could receiving a second PC5-RRC message from the second UE, wherein the second PC5-RRC message includes the layer-2 identity of the first UE and a first local UE ID for the first UE.

In one embodiment, the fourth PC5-S message could be sent to the first UE by using a layer-2 identity of the third UE as Source L2ID and the layer-2 identity of the first UE as Destination L2ID. The seventh PC5-S message could be sent to the second UE by using a layer-2 identity of the third UE as Source L2ID and the layer-2 identity of the second UE as Destination L2ID.

In one embodiment, the first/fifth PC5-S message could be a Direct Communication Request message or a Direct Link Establishment Request message, and the fourth/eighth PC5-S message could a Direct Communication Accept message or a Direct Link Establishment Accept message. The second/sixth PC5-S message could be a Security Mode Command message or a Direct Link Security Mode Command message, and the third/seventh PC5-S message could be a Security Mode Complete message or a Direct Link Security Mode Complete message.

Referring back to FIGS. 3 and 4, in one exemplary embodiment of a third UE, the third UE 300 includes a program code 312 stored in the memory 310. The CPU 308 could execute program code 312 to enable the third UE (i) to receive a first PC5-S message from a first UE for initiating a procedure of establishing a first layer-2 link between the first UE and the third UE, (ii) to transmit a second PC5-S message to the first UE for establishing a first security context between the first UE and the third UE in the procedure of establishing the first layer-2 link, (iii) to receive a third PC5-S message from the first UE for completing establishment of the first security context in the procedure of establishing the first layer-2 link, and (iv) to transmit a fourth PC5-S message to the first UE for completing the procedure of establishing the first layer-2 link, wherein the fourth PC5-S message includes a layer-2 identity of a second UE. Furthermore, the CPU 308 can execute the program code 312 to perform all of the above-described actions and steps or others described herein.

Figure 23:
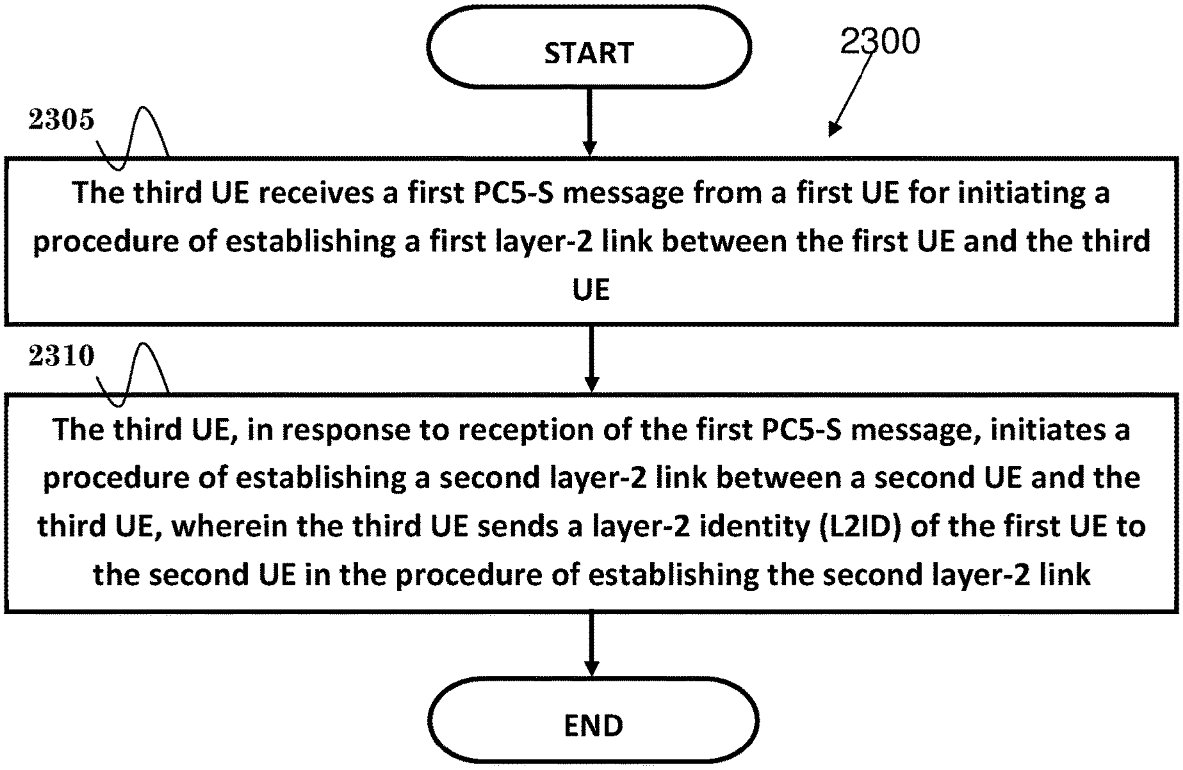
FIG. 23 is a flow chart according to one exemplary embodiment.

FIG. 23 is a flow chart 2300 illustrating an exemplary third UE. In step 2305, the third UE receives a first PC5-S message from a first UE for initiating a procedure of establishing a first layer-2 link between the first UE and the third UE. In step 2310, the third UE, in response to reception of the first PC5-S message, initiates a procedure of establishing a second layer-2 link between a second UE and the third UE, wherein the third UE sends a layer-2 identity (L2ID) of the first UE to the second UE in the procedure of establishing the second layer-2 link.

In one embodiment, the third UE could transmit a second PC5-S message to the second UE for request of establishing the second layer-2 link in the procedure of establishing the second layer-2 link. The third UE could receive a third PC5-S message from the second UE for establishing a second security context between the second UE and the third UE in the procedure of establishing the second layer-2 link. The third UE could transmit a fourth PC5-S message to the second UE for completing establishment of the second security context in the procedure of establishing the second layer-2 link. The third UE could receive a fifth PC5-S message from the second UE for completing the procedure of establishing the second layer-2 link.

In one embodiment, the first PC5-S message may contain an upper layer identity or an application layer identity of the second UE. The first PC5-S message could be received by using a first layer-2 identity of the third UE as Destination L2ID and the layer-2 identity of the first UE as Source L2ID. The second PC5-S message could be sent by using a layer-2 identity of the third UE as Source L2ID and a layer-2 identity of the second UE or a common address as Destination L2ID.

In one embodiment, the layer-2 identity of the first UE may be included in the second PC5-S message or the fourth PC5-S message. The method of claim 5, wherein the first UE is a source remote UE. The second UE may be a target remote UE. The third UE may be a UE-to-UE relay UE.

Referring back to FIGS. 3 and 4, in one exemplary embodiment of a third UE, the third UE 300 includes a program code 312 stored in the memory 310. The CPU 308 could execute program code 312 to enable the third UE (i) to receive a first PC5-S message from a first UE for initiating a procedure of establishing a first layer-2 link between the first UE and the third UE, and (ii) to initiate, in response to reception of the first PC5-S message, a procedure of establishing a second layer-2 link between a second UE and the third UE, wherein the third UE sends a layer-2 identity of the first UE to the second UE in the procedure of establishing the second layer-2 link. Furthermore, the CPU 308 can execute the program code 312 to perform all of the above-described actions and steps or others described herein.

Figure 24:
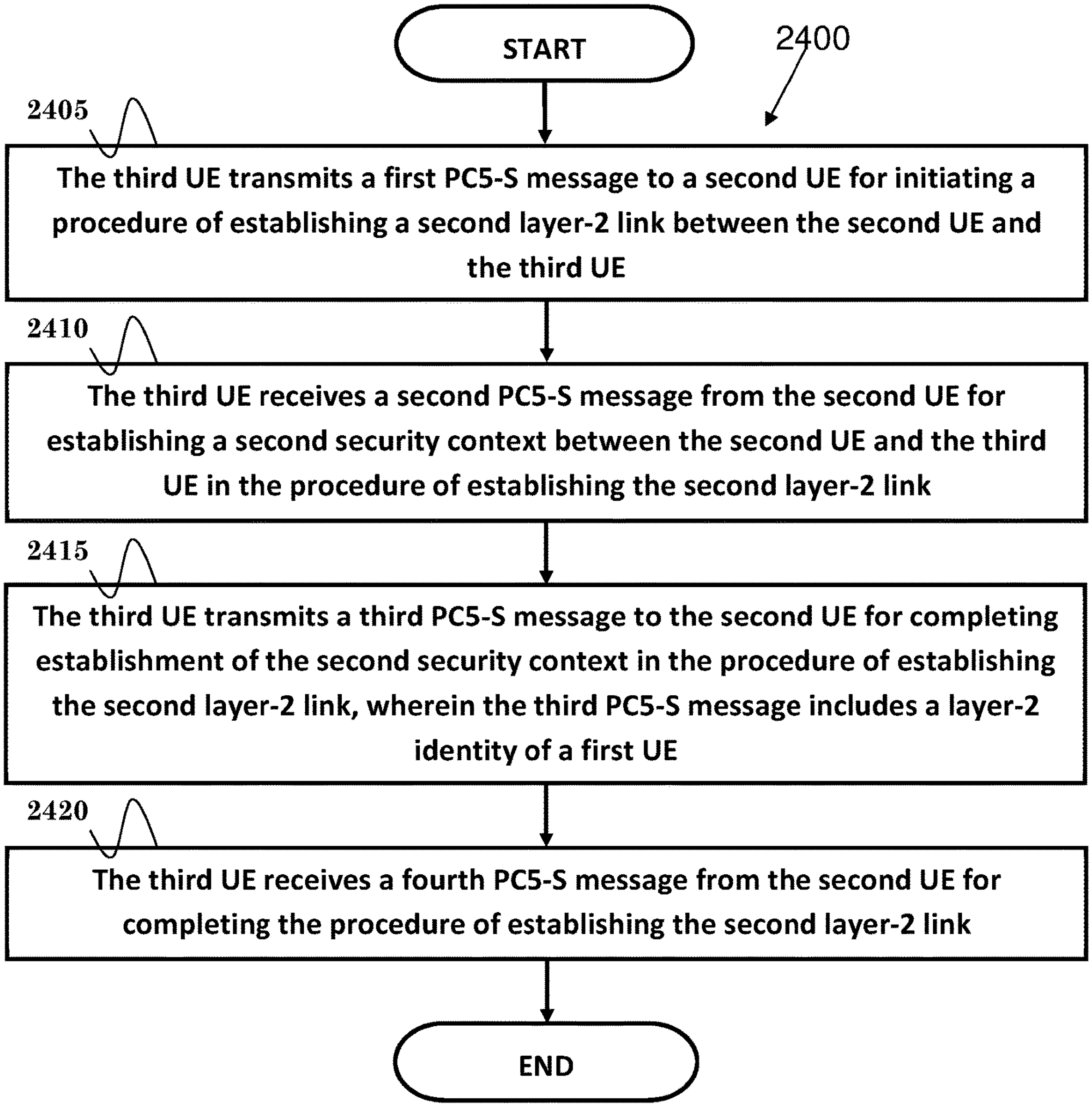
FIG. 24 is a flow chart according to one exemplary embodiment.

FIG. 24 is a flow chart 2400 illustrating an exemplary third UE. In step 2405, the third UE transmits a first PC5-S message to a second UE for initiating a procedure of establishing a second layer-2 link between the second UE and the third UE. In step 2410, the third UE receives a second PC5-S message from the second UE for establishing a second security context between the second UE and the third UE in the procedure of establishing the second layer-2 link. In step 2415, the third UE transmits a third PC5-S message to the second UE for completing establishment of the second security context in the procedure of establishing the second layer-2 link, wherein the third PC5-S message includes a layer-2 identity of a first UE. In step 2420, the third UE receives a fourth PC5-S message from the second UE for completing the procedure of establishing the second layer-2 link.

In one embodiment, the first PC5-S message may include an upper/application layer identity of the first UE.

In one embodiment, the third UE could receive a fifth PC5-S message from the first UE for initiating a procedure of establishing a first layer-2 link between the first UE and the third UE. The third UE could transmit a sixth PC5-S message to the first UE for establishing a first security context between the first UE and the third UE in the procedure of establishing the first layer-2 link. The third UE could receive a seventh PC5-S message from the first UE for completing establishment of the first security context in the procedure of establishing the first layer-2 link. The third UE could transmit an eighth PC5-S message to the first UE for completing the procedure of establishing the first layer-2 link, wherein the eighth PC5-S message includes a layer-2 identity of the second UE.

In one embodiment, the third UE could transmit a first PC5-RRC message to the first UE, wherein the first PC5-RRC message includes the layer-2 identity of the second UE and a second local UE ID for the second UE. The third UE could transmit a second PC5-RRC message to the second UE, wherein the second PC5-RRC message includes the layer-2 identity of the first UE and a first local UE ID for the first UE. The third UE could receive a first PC5-RRC message from the first UE, wherein the first PC5-RRC message includes the layer-2 identity of the second UE and a second local UE ID for the second UE. The third UE could receive a second PC5-RRC message from the second UE, wherein the second PC5-RRC message includes the layer-2 identity of the first UE and a first local UE ID for the first UE.

In one embodiment, the third PC5-S message could be sent to the second UE by using a layer-2 identity of the third UE as Source L2ID and the layer-2 identity of the second UE as Destination L2ID. The eighth PC5-S message could be sent to the first UE by using a layer-2 identity of the third UE as Source L2ID and the layer-2 identity of the first UE as Destination L2ID.

In one embodiment, the first/fifth PC5-S message may be a Direct Communication Request message or a Direct Link Establishment Request message, and the fourth/eighth PC5-S message may be a Direct Communication Accept message or a Direct Link Establishment Accept message. The second/sixth PC5-S message may be a Security Mode Command message or a Direct Link Security Mode Command message, and the third/seventh PC5-S message may be a Security Mode Complete message or a Direct Link Security Mode Complete message. The first UE may be a source remote UE, the second UE may be a destination remote UE, and the third UE may be a UE-to-UE relay UE.

Referring back to FIGS. 3 and 4, in one exemplary embodiment of a third UE, the third UE 300 includes a program code 312 stored in the memory 310. The CPU 308 could execute program code 312 to enable the third UE (i) to transmit a first PC5-S message to a second UE for initiating a procedure of establishing a second layer-2 link between the second UE and the third UE, (ii) to receive a second PC5-S message from the second UE for establishing a second security context between the second UE and the third UE in the procedure of establishing the second layer-2 link, (iii) to transmit a third PC5-S message to the second UE for completing establishment of the second security context in the procedure of establishing the second layer-2 link, wherein the third PC5-S message includes a layer-2 identity of a first UE, and (iv) to receive a fourth PC5-S message from the second UE for completing the procedure of establishing the second layer-2 link. Furthermore, the CPU 308 can execute the program code 312 to perform all of the above-described actions and steps or others described herein.

Various aspects of the disclosure have been described above. It should be apparent that the teachings herein could be embodied in a wide variety of forms and that any specific structure, function, or both being disclosed herein is merely representative. Based on the teachings herein one skilled in the art should appreciate that an aspect disclosed herein could be implemented independently of any other aspects and that two or more of these aspects could be combined in various ways. For example, an apparatus could be implemented or a method could be practiced using any number of the aspects set forth herein. In addition, such an apparatus could be implemented or such a method could be practiced using other structure, functionality, or structure and functionality in addition to or other than one or more of the aspects set forth herein. As an example of some of the above concepts, in some aspects concurrent channels could be established based on pulse repetition frequencies. In some aspects concurrent channels could be established based on pulse position or offsets. In some aspects concurrent channels could be established based on time hopping sequences. In some aspects concurrent channels could be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

The invention claimed is:

1. A method for a third User Equipment (UE), comprising:
- receiving, by the third UE, a first PC5-S message from a first UE for initiating a procedure of establishing a first layer-2 link between the first UE and the third UE for supporting a relay communication between the first UE and a second UE via the third UE;
- in response to reception of the first PC5-S message, initiating, by the third UE, a procedure of establishing a second layer-2 link between the second UE and the third UE for supporting the relay communication;
- in response to completion of establishing the first layer-2 link, sending, by the third UE, a first PC5-RRC message to the first UE, wherein the first PC5-RRC message includes a layer-2 identity (L2ID) of the second UE and a local identity for identifying the second UE; and
- receiving, by the third UE, an adaptation layer protocol data unit (PDU) from the first UE, wherein a header of the adaptation layer PDU includes the local identity for identifying the second UE.

2. The method of claim 1, comprising:
- in response to completion of establishing the second layer-2 link, sending, by the third UE, a second PC5-RRC message to the second UE, wherein the second PC5-RRC message includes a L2ID of the first UE and a local identity for identifying the first UE.

3. The method of claim 1, comprising:
- transmitting, by the third UE, a second PC5-S message to the second UE for request of establishing the second layer-2 link in the procedure of establishing the second layer-2 link;
- receiving, by the third UE, a third PC5-S message from the second UE for establishing a second security context between the second UE and the third UE in the procedure of establishing the second layer-2 link;

transmitting, by the third UE, a fourth PC5-S message to the second UE for completing establishment of the second security context in the procedure of establishing the second layer-2 link; and receiving, by the third UE, a fifth PC5-S message from the second UE for completing the procedure of establishing the second layer-2 link.

4. The method of claim 3, wherein at least one of:

the first PC5-S message includes an upper layer identity of the second UE, the first PC5-S message is received by using a L2ID of the first UE as Source L2ID, or the third PC5-S message is received by using the L2ID of the second UE as Source L2ID.

5. The method of claim 3, wherein a L2ID of the first UE is included in the second PC5-S message or the fourth PC5-S message.

6. The method of claim 1, comprising:

sending, by the third UE, a sixth PC5-S message to the first UE for establishing a first security context between the first UE and the third UE in the procedure of establishing the first layer-2 link;

receiving, by the third UE, a seventh PC5-S message from the first UE for completing establishment of the first security context in the procedure of establishing the first layer-2 link; and sending, by the third UE, an eighth PC5-S message to the first UE for completing the procedure of establishing the first layer-2 link.

7. The method of claim 6, wherein the L2ID of the second UE is included in the sixth PC5-S message or the eighth PC5-S message.

8. The method of claim 1, wherein the first UE is a source remote UE, the second UE is a target remote UE and the third UE is a UE-to-UE relay UE.

9. A third User Equipment (UE), comprising:

a control circuit;

a processor installed in the control circuit; and a memory installed in the control circuit and operatively coupled to the processor;

wherein the processor is configured to execute a program code stored in the memory to:

receive a first PC5-S message from a first UE for initiating a procedure of establishing a first layer-2 link between the first UE and the third UE for supporting a relay communication between the first UE and a second UE via the third UE;

initiate, in response to reception of the first PC5-S message, a procedure of establishing a second layer-2 link between the second UE and the third UE for supporting the relay communication;

send, in response to completion of establishing the first layer-2 link, a first PC5-RRC message to the first UE, wherein the first PC5-RRC message includes a layer-2 identity (L2ID) of the second UE and a local identity for identifying the second UE; and receive an adaptation layer protocol data unit (PDU) from the first UE, wherein a header of the adaptation layer PDU includes the local identity for identifying the second UE.

10. The third UE of claim 9, wherein the processor is further configured to execute a program code stored in the memory to:

send, in response to completion of establishing the second layer-2 link, a second PC5-RRC message to the second UE, wherein the second PC5-RRC message includes a L2ID of the first UE and a local identity for identifying the first UE.

11. The third UE of claim 9, wherein the processor is further configured to execute a program code stored in the memory to:

transmit a second PC5-S message to the second UE for request of establishing the second layer-2 link in the procedure of establishing the second layer-2 link;

receive a third PC5-S message from the second UE for establishing a second security context between the second UE and the third UE in the procedure of establishing the second layer-2 link;

transmit a fourth PC5-S message to the second UE for completing establishment of the second security context in the procedure of establishing the second layer-2 link; and receive a fifth PC5-S message from the second UE for completing the procedure of establishing the second layer-2 link.

12. The third UE of claim 11, wherein at least one of:

the first PC5-S message includes an upper layer identity of the second UE, the first PC5-S message is received by using a L2ID of the first UE as Source L2ID, or the third PC5-S message is received by using the L2ID of the second UE as Source L2ID.

13. The third UE of claim 11, wherein a L2ID of the first UE is included in the second PC5-S message or the fourth PC5-S message.

14. The third UE of claim 9, wherein the processor is further configured to execute a program code stored in the memory to:

send a sixth PC5-S message to the first UE for establishing a first security context between the first UE and the third UE in the procedure of establishing the first layer-2 link;

receive a seventh PC5-S message from the first UE for completing establishment of the first security context in the procedure of establishing the first layer-2 link; and send an eighth PC5-S message to the first UE for completing the procedure of establishing the first layer-2 link.

15. The third UE of claim 14, wherein the L2ID of the second UE is included in the sixth PC5-S message or the eighth PC5-S message.

16. The third UE of claim 9, wherein the first UE is a source remote UE, the second UE is a target remote UE and the third UE is a UE-to-UE relay UE.

* * * * *